United States Patent
Ruffini et al.

(10) Patent No.: US 11,812,398 B2
(45) Date of Patent: Nov. 7, 2023

(54) METHOD AND APPARATUS FOR SYNCHRONIZING RADIO NETWORK NODES

(71) Applicant: Telefonaktiebolaget LM Ericsson (publ), Stockholm (SE)

(72) Inventors: Stefano Ruffini, Rome (IT); Garry Irvine, Ottawa (CA); Ohan Khodaverdian, Tyresö (SE); Magnus Sandgren, Staffanstorp (SE); Mårten Wahlström, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 124 days.

(21) Appl. No.: 16/976,875

(22) PCT Filed: Feb. 28, 2019

(86) PCT No.: PCT/SE2019/050175
§ 371 (c)(1),
(2) Date: Aug. 31, 2020

(87) PCT Pub. No.: WO2019/168461
PCT Pub. Date: Sep. 6, 2019

(65) Prior Publication Data
US 2020/0413360 A1    Dec. 31, 2020

Related U.S. Application Data

(60) Provisional application No. 62/637,038, filed on Mar. 1, 2018.

(51) Int. Cl.
*H04W 56/00* (2009.01)
*H04W 72/541* (2023.01)

(52) U.S. Cl.
CPC ..... *H04W 56/0015* (2013.01); *H04W 72/541* (2023.01)

(58) Field of Classification Search
None
See application file for complete search history.

(56) References Cited

U.S. PATENT DOCUMENTS 10,264,541 B2 * 4/2019 Patel ............... H04W 74/02
10,411,986 B2 * 9/2019 Mihelic ............ H04L 27/2657
(Continued)

FOREIGN PATENT DOCUMENTS

WO   2016159864 A1   10/2016
WO   2016159865 A1   10/2016
(Continued)

OTHER PUBLICATIONS www.eecis.udel.edu, IEEE 1588 Precision Timing Protocol (PTP), 2012.*
(Continued)

*Primary Examiner* — Kodzovi Acolatse
*Assistant Examiner* — Anindita Sen
(74) *Attorney, Agent, or Firm* — Murphy, Bilak & Homiller, PLLC

(57) ABSTRACT

A group of radio network nodes (14) performs automatic synchronization source selection using Radio-interface Based Synchronization, based on the exchange of clock-attribute information between respective nodes (14) via inter-node connections. Access to the clock-attribute information for other nodes (14) in the same domain or subdomain allows a given node (14) to select the best or most preferred synchronization source for use in synchronizing its own clock (44), based on a combined or joint evaluation of (Continued)

parameters or metrics that include the reception quality of OTA signals from respective ones of the candidate nodes (14) and the corresponding clock-attribute information. Further parameters or metrics may be evaluated in the selection, such as neighbor-relation considerations. The combined use of OTA synchronization signaling and clock-attribute information exchanges, e.g., according to IEEE 1588 PTP, enables the group of nodes (14) to carry out Best Master Clock Selection (BMCS) or Alternate BMCS algorithms on an automatic basis.

17 Claims, 19 Drawing Sheets

(56) References Cited

U.S. PATENT DOCUMENTS

| | | | | |
|---|---|---|---|---|
| 2014/0219267 A1* | 8/2014 | Eyuboglu | ............ | H04W 56/001 370/350 |
| 2016/0057719 A1* | 2/2016 | Centonza | ............. | H04B 7/2687 370/350 |
| 2016/0302165 A1* | 10/2016 | Da | ....................... | H04W 56/001 |
| 2019/0036804 A1* | 1/2019 | Mihelic | ................. | H04J 3/0697 |

FOREIGN PATENT DOCUMENTS

| | | | | |
|---|---|---|---|---|
| WO | 2016181197 A1 | 11/2016 | | |
| WO | 2017111670 A1 | 6/2017 | | |
| WO | 2017171621 A1 | 10/2017 | | |
| WO | 2017171623 A2 | 10/2017 | | |
| WO | WO 2017/171621 A1 * | 10/2017 | ............ | H04W 56/00 |
| WO | WO-2017171621 A1 * | 10/2017 | ........ | H04W 56/0015 |

OTHER PUBLICATIONS www.eecis.udel.edu,IEEE 1588 Precision Timing Protocol (PTP),2012 (Year: 2012).*

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.4.0, Dec. 2018, pp. 1-363.

Unknown, Author, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 15)", 3GPP TR 36.922 V15.0.0, Jun. 2018, pp. 1-74.

Unknown, Author, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.4.0, Dec. 2018, pp. 1-383.

Unknown, Author, "3rd Generation Partnership Project; Technical Specification Group Services and System Aspects; Telecommunication management; Home enhanced Node B (HeNB) Operations, Administration, Maintenance and Provisioning (OAM&P); Information model for Type 1 inter", 3GPP TS 32.592 V15.0.0, Jun. 2018, pp. 1-94.

Unknown, Author, "P1588™/D1.4 Draft Standard for a Precision Clock Synchronization Protocol for Networked Measurement and Control Systems", P1588/D1.4V4_04, Sep. 2018, pp. 1-528.

Unknown, Author, "Precision time protocol telecom profile for phase/time synchronization with full timing support from the network", ITU-T; G.8275.1/Y.1369.1; Amendment 2, Mar. 2018, pp. 1-70.

* cited by examiner

| BITS | | | | | | | | | OCTETS | TLV OFFSET |
|---|---|---|---|---|---|---|---|---|---|---|
| 7 | 6 | 5 | 4 | 3 | 2 | 1 | 0 | | | |
| tlvType | | | | | | | | | 2 | 0 |
| lengthField | | | | | | | | | 2 | 2 |
| bcHopCount | | | | | | | | | 1 | 4 |
| tcHopCount | | | | | | | | | 1 | 5 |
| Reserved | | | | | | | | | 2 | 8 |
| maxGmInaccuracy | | | | | | | | | 8 | 8 |
| varGmInaccuracy | | | | | | | | | 8 | 18 |
| maxTransientInaccuracy | | | | | | | | | 8 | 24 |
| varTransientInaccuracy | | | | | | | | | 8 | 32 |
| maxDynamicInaccuracy | | | | | | | | | 8 | 40 |
| varDynamicInaccuracy | | | | | | | | | 8 | 48 |
| maxStaticInstanceInaccuracy | | | | | | | | | 8 | 56 |
| varStaticInstanceInaccuracy | | | | | | | | | 8 | 64 |
| maxStaticMediumInaccuracy | | | | | | | | | 8 | 72 |
| varStaticMediumInaccuracy | | | | | | | | | 8 | 80 |

*FIGURE 12*

METHOD AND APPARATUS FOR SYNCHRONIZING RADIO NETWORK NODES

TECHNICAL FIELD

The present invention relates to wireless communication networks and particularly relates to synchronizing radio network nodes.

BACKGROUND

The increasing use of technologies and techniques such as Time Division Duplexing (TDD) and Carrier Aggregation (CA) translate into an increased need for synchronization between radio network nodes. CA, for example, requires phase alignment between the involved radio base stations, meaning that the radio base stations must have good time synchronization between them. As another example, the network "fronthaul" may include multiple antennas that require phase alignment. Synchronization accuracy requirements in these and other scenarios are at the microsecond level, and the Third Generation Partnership Project (3GPP) has specific even better accuracy in certain specifications.

The use of Global Navigation Satellite Systems (GNSS), such as the Global Positioning System or GPS, is a common way of providing time synchronization without requiring the delivery of timing information over the involved transport network. GNSS includes a "control segment," a "space" segment, and a "user" segment.

The control segment includes a coordinated, group of stations at various locations on the ground. The stations include ground atomic clocks acting as master clocks for the orbiting satellites and provide control and monitoring links to the satellites, such as enabling satellites, providing orbit or time corrections, uploading data such as ephemeris, an ionospheric model, etc.

The space segment of GNSS includes the satellites operating under the management of the control segment. The space segment transmits time, ephemeris, and status information for reception by GNSS receivers on the ground, and the satellites typically include high-stability oscillators that can be tuned by the control segment for optimal timing accuracy.

The user segment of GNSS includes the various GNSS receivers adapted to receive and use the information transmitted from the satellites, e.g., for geolocation and precision time recovery. Incorporating GNSS receivers into radio network nodes, such as base stations or other radio control units, provides the nodes with an accurate time reference.

Of course, the use of GNSS poses certain challenges. For example, to obtain time from GNSS directly, the GNSS receiver of the node must be able to receive signals from multiple satellites, e.g., a minimum of four satellites. Consequently, nodes that are located indoors or operated in other locations having poor or no reception of the satellite signals generally cannot directly obtain GNSS timing. Moreover, the weak signal levels associated with terrestrial reception of the satellite signals make such signals vulnerable to interference and jamming.

Radio-interface based synchronization or "RIBS" allows one radio network node to synchronize to another radio network node based on detecting one or more synchronization signals transmitted by the other radio network node over the air interface. Other terminology may be used to describe the general approach, such as "network listening" or "OTA synchronization," which refers to the over-the-air nature of the synchronization scheme.

Originally introduced in Release 9 of the 3GPP specifications as a solution for the synchronization of Home eNodeBs (HeNBs) in TDD modes, Release 12 of the 3GPP specifications added provisions for coordinating "muting" between radio network nodes, to reduce interference affecting network listening operations. In particular, the 3GPP Technical Specification (TS) 36.300 explains that RIBS enables an eNB to monitor the reference signals of another eNB for the purpose of OTA synchronization by means of network listening. Correspondingly, RIBS requires Operation & Maintenance (OAM) support to configure the eNBs using OTA synchronization with information about the reference signals available from neighboring eNBs, e.g., reference signal patterns, periodicities, and offsets. Such information enables reference signal detection, and the OAM should coordinate the reference signal information, for example via one to one mapping between stratum level and reference signal—here, "stratum level" denotes the number of hops between a node transmitting reference signals and the source of synchronization for that node. Further details regarding RIBS are found in the 3GPP Technical Report (TR) 36.922 and corresponding signaling message definitions appear in 3GPP TS 36.413 and TS 32.592.

FIG. 1 illustrates an example RIBS scenario where an HeNB operating as a femto cell takes its synchronization from an eNB operating as a macro cell. More particularly, FIG. 1 illustrates a first femto cell (Femto 1) taking its synchronization from the macro cell (Macro), and a second femto cell (Femto 2) taking its synchronization from Femto 1. FIG. 1 thus provides a good illustration of direct and indirect time references and the possibility of multi-hop synchronization.

The macro cell transmits a Primary Synchronization Signal (PSS) and a Secondary Synchronization Signal (SSS), where successful detection of the PSS by the HeNB operating as Femto 1 allows the HeNB to obtain 5 ms frame synchronization with the macro cell, while successful detection of the SSS allows for synchronization and alignment with the 10 ms frame boundaries of the macro cell. Once the HeNB operating as Femto 1 gains initial frame timing and alignment with the macro eNB, it sends a random access request towards the macro eNB, which measures the uplink timing of the HeNB and returns a random access acknowledgement that contains a Timing Advance (TA) value to correct for the wireless propagation delay (distance) between the eNB and the HeNB.

Femto 2 may similarly gain synchronization with Femto 1. In such an example, Femto 1 synchronizes directly with the macro eNB, and Femto 2 synchronizes indirectly with the macro eNB via Femto 1. Thus, the HeNB operating as Femto 1 takes its synchronization directly from the eNB operating as Macro, over a single hop, while the HeNB operating as Femto 2 takes its synchronization from Femto 1. Femto 2 can be understood, therefore, as being indirectly synchronized to the Macro eNB, via two hops.

Notably, signals other than PSS/SSS may be used for OTA synchronization, such as Positioning Reference Signals (PRS). PRS may provide improved performance, given the signal-to-noise ratio (SNR) gains that may be enjoyed for PRS reception when muting is applied to potentially interfering signals from other nodes.

As better seen in the OTA example of FIG. 2, OTA synchronization must account for the propagation delay between the transmitting node and the listening node. Thus, in the diagram, the eNB using OTA synchronization must know or otherwise compensate for the propagation delays (t1, t2), for accurate timing adjustment. The propagation speed is 300 m per microsecond, and the timing requirement for TDD is +/−1.5 microsecond at the Antenna Reference Point (ARP), the propagation delay must be known with an accuracy of approx. 0.5 us~150 meters or better.

To evaluate a given eNB as a candidate for RIBS use, the eNB needing synchronization should obtain certain information, such as: (a) clock stratum information that indicates the number of hops between the candidate node and its synchronization source, which in practice is an indication of whether the candidate eNB has a direct GNSS-based clock source; and (b) synchronization status that indicates whether the candidate node is connected to a synchronized reference clock, such as a GNSS-based clock, or to a non-synchronized reference clock, e.g., a drifting clock.

Earlier details mentioned the possibility of using muting so that a given radio network node receives OTA synchronization signals with no interference or at least reduced interference. In such arrangements, the radio network node may select another radio network node as its synchronization source and may further identify one or more other radio network nodes as potential interferers regarding its reception of OTA synchronization signals from the selected synchronization source, and it may request that the potential interferers mute the potentially interfering transmissions. Note, too, a radio network node operating with Frequency Division Duplexing (FDD) must mute its own transmissions when receiving PRS signals from another node for OTA synchronization.

FIG. 3 illustrates an example arrangement supporting muting for OTA synchronization, based on "S1" signaling between the involved eNBs and a supporting Mobility Management Entity (MME) in the network. At Step 1, eNB1 generates an eNB Configuration Transfer message containing a SON Information Transfer IE with a SON Information Request IE set to "Time synchronization Info." At Step 2, the MME receiving the eNB Configuration Transfer message forwards the SON Information Transfer IE towards a target eNB2 indicated in the IE by means of the MME Configuration Transfer message. At Step 3, the receiving eNB2 may reply with an eNB Configuration Transfer message towards the eNB1 including a SON Information Reply IE with the Timing Synchronization Information IE, which consists of Stratum Level and Synchronization Status of the sending node. The message may include further parameters about the availability of the muting function and details of already active muting patterns. These further parameters may include a Stratum Level parameter that indicates the number of hops between the node to which the stratum level belongs to the source of a synchronized reference clock. That is, when the stratum level is M, the eNB is synchronized to an eNB whose stratum level is M−1, which in turn is synchronized to an eNB with stratum level M−2 and so on. The eNB with stratum level 0 is the synchronization source. Thus, an eNB taking its synchronization directly from a GNSS-based clock would report its stratum level as zero.

The further synchronization parameters may also include a Synchronization Status parameter that indicates whether the node signaling such parameter is connected to a synchronized reference clock, such as a GPS source, or to a non-synchronized reference clock, e.g., a drifting clock. Notably, the phrase "connected to" as used here considers the stratum level. Thus, a node transmitting these further parameters uses the Stratum Level parameter to indicate how many hops are between it and the synchronization reference or source, and it uses the Synchronization Status parameter to indicate the nature of that synchronization source or reference.

Turning back to the illustrated signaling flow, at Step 4, the MME receiving the eNB Configuration Transfer message from eNB2 forwards it to eNB1 by means of the MME Configuration Transfer message. The eNB1 then selects the signal of the best available cell as a synchronization source and identifies whether there are neighbor cells interfering with the synchronization source signal. If such interfering cells are identified, e.g., in eNB2's cells, at Step 5, eNB1 sends an eNB Configuration Transfer including information about the cell selected as synchronization source as well as a request to activate muting on certain specific cells. The information on the synchronization source cell may consist of the synchronization RS period, offset, the synchronization node's stratum level.

At Step 6, the MME receiving the eNB Configuration Transfer message from eNB1 forwards it to eNB2 by means of the MME Configuration Transfer message and eNB2 determines whether the muting request from eNB1 can be fulfilled and activates muting patterns that are most suitable to such request. At Step 7, eNB2 responds with an eNB Configuration Transfer message containing muting pattern information such as muting pattern period (period of muted subframes) and muting pattern offset. At Step 8, the MME receiving the eNB Configuration Transfer message from eNB2 forwards it to eNB1 by means of the MME Configuration Transfer message.

If eNB1 determines that muting at eNB2's cells is no longer needed, eNB1 can trigger an eNB Configuration Transfer message containing a muting deactivation request, shown here at Step 9. The MME receiving the eNB Configuration Transfer message from eNB1 forwards it to eNB2 at Step 10 by means of the MME Configuration Transfer message. eNB2 may then deactivate the muting pattern, meaning that eNB2 may again freely transmit on the subframes previously muted.

Node Group Synchronization or NGS represents another synchronization technology, and it relies on a protocol designed to control the synchronization of multiple nodes in a "fronthaul" network to each other and to a single external reference. Any node, also referred to as a "unit," can take the sync master role, also referred to as the Sync Provider role. Other units then take on the Sync Receiver Role, which may be understood as slaving their timing to the Sync Provider. These roles are dynamic and may change as the sync capabilities of involved nodes change, although role updating happens in a controlled fashion to avoid sporadic role changes.

Other known mechanisms for synchronizing nodes include the Network Time Protocol (NTP) and the Precision Time Protocol (PTP) specified by the IEEE 1588 specification and see ITU-T G.82751. PTP provides for inter-node synchronization based on the exchange of timing information via synchronization messages that are accurately time-stamped with respect to transmission and reception, and PTP assumes symmetric delays between a given slave clock and the master clock to which the slave clock synchronizes. Variabilities in network transit delay of the synchronization messages can be accounted for if all involved nodes are PTP aware, but that often is not the case, e.g., in wireless backhaul networks and when interworking between the backhauls of different wireless network operators.

While certain synchronization protocols provide for automatic clock selection, such as with the Best Master Clock Algorithm (BMCA) implemented in PTP, there currently are no mechanisms for automatically establishing hierarchical best-clock relationships among radio network nodes in RIBS scenarios. Here, it should be appreciated that the term "best" depends on various parameters, meaning that the "best" sync reference for a given node is not necessarily the most accurate one, and further key considerations include the avoidance of timing loops when establishing synchronization references. Neither IEEE 1588 nor NGS provides mechanisms for integrating RIBS-based synchronization into a synchronization network, particularly with NGS focusing on synchronizing Remote Radio Units (RRUs) that are shared by the same Digital Unit (DU).

The expected increase in the number of nodes using RIBS for synchronization means that manually provisioning synchronization hierarchies in the Radio Access Network (RAN) context will be impractical at best.

SUMMARY

A group of radio network nodes performs automatic synchronization source selection using Radio-interface Based Synchronization, based on the exchange of clock-attribute information between respective ones of the nodes via inter-node connections. Having access to the clock-attribute information for other radio network nodes in the same domain or subdomain allows a given node to select the best or most preferred synchronization source for use in synchronizing its own clock, based on a combined or joint evaluation of parameters or metrics that include the reception quality of OTA signals from respective ones of the candidate nodes and the corresponding clock-attribute information. Further parameters or metrics are included in the combined evaluation in some embodiments, such as neighbor-relation considerations. The combined use of OTA synchronization signaling and clock-attribute information exchanges, e.g., according to IEEE 1588 PTP, enables a group of radio network nodes to carry out Best Master Clock Selection (BMCS) or Alternate BMCS algorithms on an automatic basis, thereby obviating or greatly reducing the need for manual provisioning or setup.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 12 is a table of example parameter values for use in automatic synchronization reference selection for RIBS.

DETAILED DESCRIPTION

Figure 6:
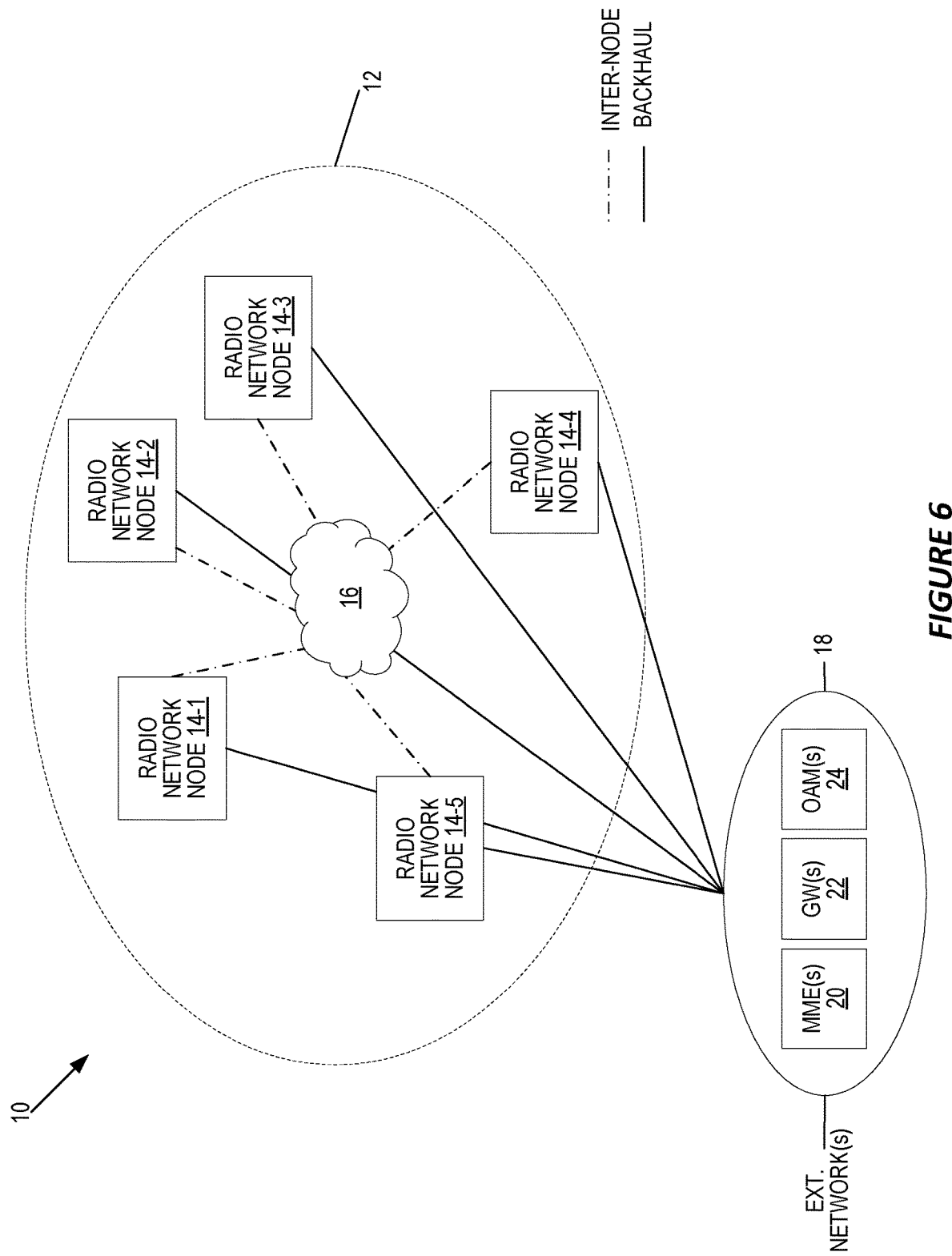
FIG. 6 is a block diagram of one embodiment of a wireless communication network.

FIG. 6 illustrates an example embodiment of a wireless communication network 10 that includes a Radio Access Network (RAN) 12, with the RAN 12 including a number or radio network nodes 14 having inter-node connections 16, e.g., such as implemented via a transport network or other inter-node communication links. The network 10 further includes a core network (CN) 18, with the CN 18 including nodes providing control and connectivity for wireless communication devices (not shown) using the network 10 for communication services. For example, the CN 18 includes one or more Mobility Management Entities (MMEs) 20, one or more Gateway (GW) nodes 22, and one or more Operations & Maintenance (OAM) nodes 24.

Of course, other node names or terminology may be used in dependence on the network standard(s) embodied in the network 10. By way of example, the network 10 is a Third Generation Partnership Project (3GGP) network, such as a Long Term Evolution (LTE) network. In another example embodiment, the network 10 is a Fifth Generation (5G) network, e.g., where the radio network nodes 14 use beamforming to provide wireless coverage to User Equipments (UEs) communicatively coupled to respective ones of the nodes 14. Further, it should be appreciated that the illustration may be simplified and that the network 10 may include additional nodes of the same types as shown or additional nodes of other types.

Still further, the radio network nodes 14 may be of the same type, e.g., macro coverage base stations, or may be a mix of different node types, e.g., a mix of macro and pico base stations, or a mix of Baseband Units (BBUs), also referred to as Digital Units (DUs) or Radio Equipment Controllers (RECs), and corresponding Remote Radio Units (RRUs), also referred to as Remote Radio Heads (RRHs). For example, a given radio network node 14 acting as a REC or BBU may control and make use of one or more other ones of the radio network nodes acting as RRUs for the REC or BBU. In that scenario, the REC or BBU may perform radio transmission and reception operations using its own radio interface circuitry and may perform radio transmission and reception operations using the radio interface circuitry of the RRUs.

Figure 7:
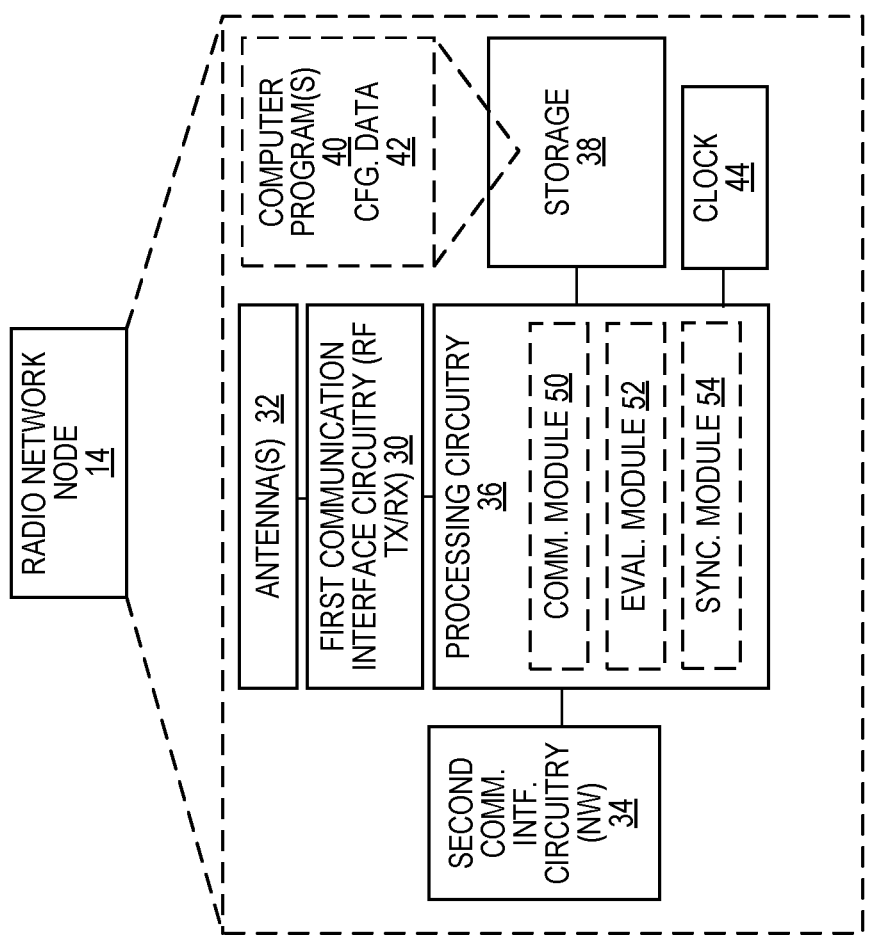
FIG. 7 is a block diagram of one embodiment of a radio network node configured for operation in a wireless communication network.

FIG. 7 illustrates an example embodiment of a radio network node 14, but it should be understood that it may include further circuitry or interfaces or may omit one or more items of illustrated circuitry or interfaces. In one or more example embodiments, the illustrated radio network node 14 comprises a radio base station, such as an eNB in the LTE context or a gNB in the 5G New Radio (NR) context. Those skilled in the art will recognize the depicted example as non-limiting, as the functionality of interest may be realized using other physical and functional circuitry arrangements.

With these qualifiers in mind, the example node 14 includes first communication interface circuitry 30, which in one or more embodiments includes radiofrequency receiver circuitry and radiofrequency transmitter circuitry respectively configured for receiving Over-the-Air (OTA) synchronization signals from radio network nodes within radio-reception range of the node 14 and transmitting OTA synchronization signals. Of course, the first communication interface circuitry 30 may be configured to support UEs operating in the network 10, e.g., to provide radio links to multiple UEs according to the applicable air interface protocols, e.g., LTE, 5G, etc. Correspondingly, the first communication interface circuitry 30 couples to one or more transmit/receive antennas 32, such as multiple antenna elements or arrays for Multiple-Input-Multiple-Output (MIMO) operation, beamforming, etc.

The node 14 comprises further, "second" communication interface circuitry 34 configured for inter-node communications, e.g., "X2" or other inter-node communications within the RAN 12. The second communication interface circuitry 34 comprises, for example, computer network interface circuitry, e.g., Ethernet communication circuitry, or other such circuitry for coupling to a transport network or other communication links, depicted as inter-node connections 16, that interconnect various ones of the radio network nodes 14 in the RAN 12.

The example node 14 further includes processing circuitry 36, which may comprise one or more Central Processing Units (CPUs), along with supporting storage 38. The storage 38 comprises one or more types of computer-readable media, such as a combination of one or more types of long-term storage and one or more types of dynamic or working storage. In an example implementation, the storage 38 comprises one or more types of non-volatile storage, such as Solid-State Disk, hard disk, FLASH, etc., and one or more types of volatile storage, such as Static RAM, Dynamic RAM, etc.

Broadly, the processing circuitry 36 should be understood as comprising fixed, dedicated circuitry or programmatically-configured circuitry, or some combination of fixed circuitry and programmatically-configured circuitry. In one or more embodiments, for example, the processing circuitry 36 comprises one or more microprocessors, microcontrollers, Digital Signal Processors (DSPs), Application Specific Integrated Circuits (ASICs), Field Programmable Gate Arrays (FPGAs), or other digital processing circuits that are specially adapted—configured—to operate as described herein, based on their execution of computer program instructions comprising one or more computer programs stored in the storage 38.

As an example of such an arrangement, FIG. 7 depicts the storage 38 as storing one or more computer programs 40, along with configuration data 42, which may comprise preconfigured information, dynamically configured information, or a mix thereof. In at least one example, the configuration data 42 includes own-clock attribute information that allows the radio network node 14 to report the clock type, quality, priority, and/or other clock attributes, so that its preferability for use as a synchronization source by other nodes 14 may be assessed. The configuration data 42 may also include location information, relative distance information, timing advance values, or other information enabling the radio network node 14 to compensate OTA synchronization signals received from other nodes 14 in the RAN for the wireless propagation delay experienced by those signals. Such information may be provisioned in the radio network node 14 or may be signaled to the radio network node 14 or may be derived by the radio network node 14, e.g., via Round-Trip-Time (RTT) calculations for OTA signals going between it and one or more other nodes 14 in the RAN 12.

In at least one embodiment, the radio network node 14 is configured for automatic synchronization source selection in a Radio-interface Based Synchronization (RIBS) scheme, meaning that the radio network node 14 synchronizes its own clock, shown as a clock 44 in the diagram, with the clock of another radio network node 14 based on receiving OTA synchronization signals from the other radio network node 14. Advantageously, the radio network node 14 selects the best or most preferred synchronization reference automatically, based on acquiring clock-attribute information from other radio network nodes 14 that are candidates for its use in RIBS, and making a joint or combined evaluation of the clock-attribute information and the reception qualities of the OTA synchronization signals received from the candidate nodes 14. Such operations may be carried out in the context of a Node Group Synchronization arrangement, or in the context of an IEEE 1588 Precision Time Protocol (PTP) synchronization arrangement.

More broadly, the arrangement enables a group of radio network nodes 14 to carry out Best Master Clock Selection (BMCS) or Alternate BMCS algorithms on an automatic basis, by incorporating inter-node signaling of own-clock attribute information that allows each given node 14 to advertise the quality of its clock and/or assess the quality or overall preferability of the clocks in those nodes that are candidates for its use in performing OTA-based synchronization. Based on such operations, a given radio network node 14 within the RAN 12, or at least within a defined segment or subdomain of the RAN 12, identifies the most preferred source for synchronizing its clock 44 based on evaluating a combination of parameters or metrics for the other radio network nodes 14 that are candidates for its use in RIBS. The combination of parameters or metrics includes the clock attributes of the candidate nodes and the reception quality of the OTA synchronization signals from the candidate nodes. At least some embodiments incorporate additional parameters or metrics into the combined evaluation, such as the existence or absence of a neighbor relation with the candidate node 14 under consideration for selection as a synchronization source. Such additional considerations reflect the fact that a given candidate node 14 may be preferred over another node with higher clock quality if the given candidate node 14 and the node 14 making the synchronization source selection operate according to a neighboring relation.

In a first detailed example embodiment, a radio network node 14 is configured for operation in a RAN 12 of a wireless communication network 10 and comprises first communication interface circuitry 30, second communication interface circuitry 34, and operatively associated processing circuitry 36.

The first communication interface circuitry 30 is configured to receive, via included radio interface circuitry, over-the-air (OTA) synchronization signals from each of two or more neighboring radio network nodes 14. Here, the term "neighboring" does not necessarily mean that the radio network node 14 has established neighbor relations with such other nodes 14 but does connote geographic proximity and/or membership in the same network domain, subdomain, or segment. The OTA synchronization signals comprise, for example, Cell Reference Signals (CRS), or Primary and Secondary Synchronization Signals (PSS/SSS), or Positioning Reference Signals (PRS), or some combination thereof.

The OTA synchronization signals transmitted by each neighboring radio network node 14 have a discernable signal timing tied to a node clock 44 of the neighboring radio network node 14. For example, the OTA synchronization signals may have periodic components, framing, or other discernable "structure" having a timing dictated by the clock 44 of the node 14 transmitting the OTA synchronization signals.

Thus, the "timing" of a node 14 may be understood as its radio link timing and associated processing operations. In an example embodiment, when a first radio network node 14 synchronizes its own-clock 44 to the clock 44 of a second radio network node 14 via RIBS—i.e., based on receiving OTA synchronization signals from the second radio network node 14—it obtains frequency and phase synchronization with the second radio network node 14. That is, it controls the timing of its clock 44 (e.g., a precision oscillator or other time-base circuit) to match the phase and frequency of the other clock 44, as discerned from the OTA synchronization signals received from the second radio network node 14. The first radio network node 14 may further time-synchronize to the second radio network node 14—i.e., operate according to the same time epoch or time reference—based on receiving additional information indicating the synchronization source of the other clock 44.

The second communication interface circuitry 34 is configured to receive clock-attribute information for the two or more neighboring radio network nodes via a network interface, such as transport-network connection to a transport network, e.g., as represented by the inter-node connections 16. The clock-attribute information for a given neighboring radio network node 14 indicates one or more clock attributes for the clock 44 used by the given neighboring radio network node for its timing. Such attributes include, for example, any one or more of an identification of the synchronization source of the clock 44, e.g., GNSS-based timing, an indication of the number of hops separating the clock 44 from its synchronization source, which is referred to as the clock stratum, clock and/or node identifiers, a clock priority level indicating its preferability or priority for selection, etc.

Further, the processing circuitry 36 of the radio network node 14 is configured to evaluate reception qualities of the respective OTA synchronization signals together with the corresponding clock-attribute information, to identify a preferred synchronization source for the radio network node 14, and to synchronize the clock 44 used by the radio network node 14 for its timing with the preferred synchronization source.

In an example case, the radio network node 14 receives OTA synchronization signals from two or more other radio network nodes 14 that are within its defined group, network domain, subdomain, or segment or are otherwise suitable for its selection as a synchronization source. Such other radio network nodes 14 are thus considered as "candidates" or "candidate nodes" for consideration in synchronization source selection operations. The radio network node 14 uses a combination of parameters or metrics to select a synchronization source for its clock 44, at least assuming that its own clock 44 does not already have a better synchronization source, e.g., a built-in GPS receiver. In particular, the radio network node 14 makes a joint or combined evaluation of the OTA synchronization signals it receives via its air interface and the corresponding clock-attribute information it receives via its network or inter-node interface(s), to identify which other radio network node 14 is the most preferred synchronization source. As noted, it may be that neighbor relations make one node more attractive than another, assuming that such other node meets at least minimum or threshold clock-quality requirements, or it may be that the OTA synchronization signals from one node have better-received quality, but that node is less preferred because it has a lower-quality clock—e.g., less precise, further removed from its source (stratum), etc.

Figure 4:
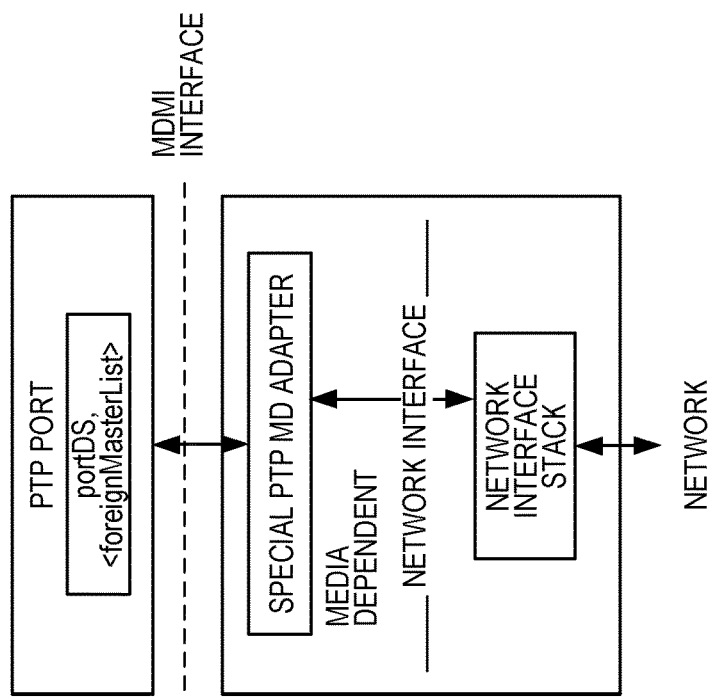
FIG. 4 is a block diagram illustrating the "special port" concept from IEEE 1588 PTP.
Figure 5:
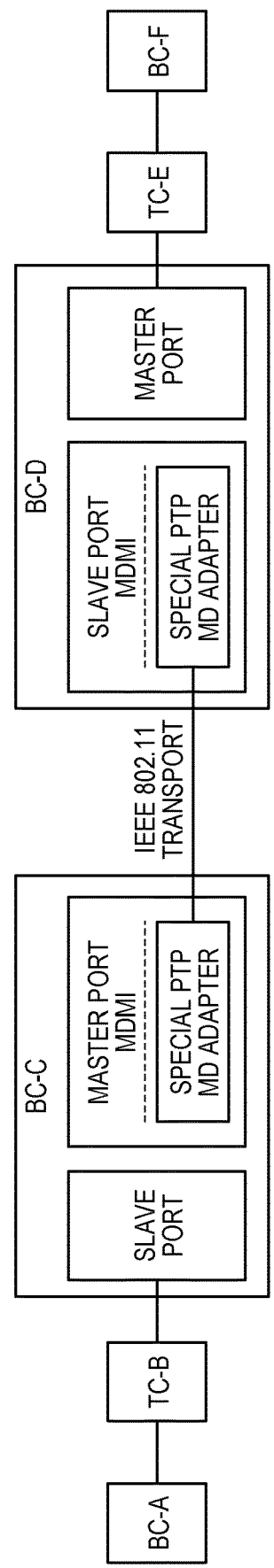
FIG. 5 is a block diagram illustrating the use of the special port for implementation of IEEE 1588 PTP over Wi-Fi.

In one or more embodiments, the radio network node 14 is configured to receive the clock-attribute information in announcement messages sent according to the IEEE 1588 Precision Time Protocol (PTP) and to treat the OTA synchronization signals as special port signals substituting for IEEE 1588 synchronization messages. See FIGS. 4 and 5.

In one or more embodiments, the radio network node 14 is provisioned with or is configured to request information from a node in the wireless communication network 10 indicating propagation delays between the radio network node and respective ones of the two or more neighboring radio network nodes 14, or providing information enabling the radio network node to derive the propagation delays, and the processing circuitry 36 is configured to compensate the OTA synchronization signals for wireless propagation delays. For example, the processing circuitry 36 uses the second communication interface circuitry 34 of the radio network node 14 to communicate with an MME 20 or another node in the CN 18, such as an OAM node 24.

In one or more embodiments, the processing circuitry 36 is configured to request and receive information from a node in the wireless communication network 10 identifying the two or more neighboring radio network nodes 14. For example, the processing circuitry 36 uses the communication interface circuitry 34 of the radio network node 14 to communicate with an MME 20 or another node in the CN 18, such as an OAM node 24.

In one or more embodiments, the processing circuitry 36 is configured to request and receive information from a node in the wireless communication network 10 identifying transmission schedule or resource information, to enable the radio network node 14 to acquire the OTA synchronization signals of the two or more neighboring radio network nodes 14.

In one or more embodiments, the radio network node 14 comprises a radio base station and is configured to receive the clock-attribute information via messages exchanged over an inter-base-station interface, e.g., via the second communication interface circuitry 34 coupling the radio network node 14 to other nodes 14 via the transport network 16 or other communication links.

In one or more embodiments, the radio network node 14 is configured for operation as part of a Node Group (NG) operating with Node Group Synchronization (NGS).

In one or more embodiments, the processing circuitry 36 is configured to evaluate neighbor relations with respect to the two or more neighboring radio network nodes 14 and identify the preferred synchronization source based on a combination of neighbor relations, reception qualities of the respective OTA synchronization signals, and the corresponding clock-attribute information. For example, the processing circuitry 36 is configured to evaluate the reception qualities of the respective OTA synchronization signals together with the corresponding clock-attribute information, to identify a preferred synchronization source for the radio network node 14. Such operations comprise, from among neighboring radio network nodes 14 having OTA signals that at least meet a minimum reception quality threshold, choosing the neighboring radio network node 14 having the most preferred clock according to a defined set of preferences. In such an embodiment or in one or more other embodiments, the clock-attribute information includes a clock stratum indication, wherein clock stratum indicates the hop count between a clock and its timing source.

In one or more embodiments, the radio network node 14 comprises a number of modules that are configured to perform the above-described receiving, evaluating, and synchronizing operations. Such modules may comprise physical modules or functional modules. In one or more such embodiments, the modules are configured, instantiated, or otherwise formed based on the execution of computer program instructions. In any case, in an example arrangement, the node 14 includes one or more communication modules 50 that are configured to perform the above-described receiving operations (OTA sync and announce messages), an evaluation module 52 that is configured to identify a preferred synchronization source as detailed above, and a synchronization module 54 that is configured to synchronize the clock 44 to the identified synchronization source, as described above.

Figure 8:
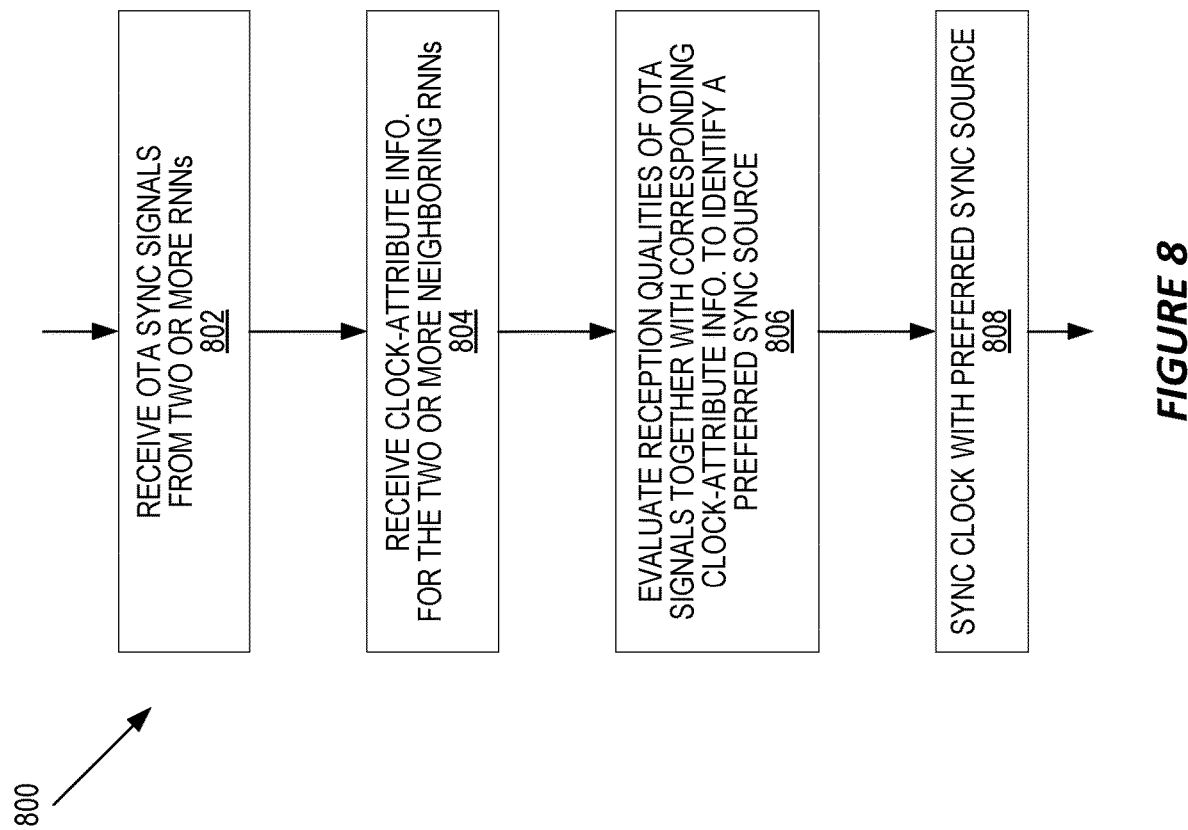
FIG. 8 is a logic flow diagram of one embodiment of a method of operation at a radio network node.

FIG. 8 illustrates a method 800 of automating RIBS at a radio network node 14 in a RAN 12 of a wireless communication network 10. The method 800 includes receiving (Block 802), via radio interface circuitry, over-the-air (OTA) synchronization signals from each of two or more neighboring radio network nodes 14. The OTA synchronization signals transmitted by each neighboring radio network node 14 have a discernable signal timing tied to a node clock 44 of the neighboring radio network node 14.

The method 800 further includes receiving (Block 804), via transport network interface circuitry, clock-attribute information for the two or more neighboring radio network nodes 14. The clock-attribute information for a given neighboring radio network node 14 indicates one or more clock attributes for the clock 44 used by the given neighboring radio network node 14 for its timing.

The method 800 further includes evaluating (Block 806) reception qualities of the respective OTA synchronization signals together with the corresponding clock-attribute information, to identify a preferred synchronization source for the radio network node 14, and synchronizing (Block 808) a clock used by the radio network node for its timing with the preferred synchronization source.

In one or more embodiments of the method 800, the radio network node 14 receives the clock-attribute information in announcement messages sent according to the IEEE 1588 Precision Time Protocol (PTP), where the OTA synchronization signals are treated as special port signals substituting for IEEE 1588 synchronization messages.

In one or more embodiments of the method 800, the radio network node 14 is provisioned with or requests information from a node in the wireless communication network 10. The information indicates propagation delays between the radio network node and respective ones of the two or more neighboring radio network nodes 14 or provides information enabling the radio network node 14 to derive the propagation delays. Correspondingly, the method 800 includes the radio network node 14 compensating the OTA synchronization signals for wireless propagation delays.

In one or more embodiments of the method 800, the method 800 includes requesting and receiving information from a node in the wireless communication network 10 identifying the two or more neighboring radio network nodes 14.

In one or more embodiments of the method 800, the method 800 includes requesting and receiving information from a node in the wireless communication network 10 identifying transmission schedule or resource information, to enable the radio network node 14 to acquire the OTA synchronization signals of the two or more neighboring radio network nodes 14.

In one or more embodiments of the method 800, the radio network node 14 comprises a radio base station, and the radio base station receives the clock-attribute information via messages exchanged over an inter-base station interface.

In one or more embodiments of the method 800, the radio network node 14 operates as part of a Node Group operating with Node Group Synchronization.

In one or more embodiments of the method 800, the method 800 includes evaluating neighbor relations with respect to the two or more neighboring radio network nodes 14 and identifying the preferred synchronization source based on a combination of neighbor relations, reception qualities of the respective OTA synchronization signals, and the corresponding clock-attribute information.

In one or more embodiments of the method 800, the method 800 includes evaluating the reception qualities of the respective OTA synchronization signals together with the corresponding clock-attribute information, from among neighboring radio network nodes 14 having OTA signals that at least meet a minimum reception quality threshold. The evaluation provides a basis for choosing the neighboring radio network node 14 having the most preferred clock 44 according to a defined set of preferences. For example, the radio network node 14 may be configured with a preconfigured or dynamically-defined set of rules for identifying the most-preferred synchronization source. In one example, the radio network node 14 prefers lower-stratum clocks over higher-stratum clocks, but may choose a higher-stratum clock over a lower-stratum clock (possibly subject to a stratum limit), in view of one candidate node providing better OTA synchronization signals than another, or in view of one or more other synchronization priorities, such as the need for good phase synchronization with a particular node that is among the candidates being evaluated.

In one or more embodiments of the method 800, the clock-attribute information includes a clock stratum indication, wherein clock stratum indicates the hop count between a clock and its timing source.

With the above examples in mind, automatic handling of RIBS may be performed according to several approaches contemplated herein. An example approach advantageously exploits communications and capabilities from NGS (Node Group Sync), such as used in fronthaul networks based on the Common Public Radio Interface or CPRI, or from IEEE 1588, which may use fronthaul, backhaul, and/or sidehaul communications.

As will be appreciated by those of ordinary skill in the art, the term "fronthaul" refers to the nodes and interconnections constituting the Radio Access Network (RAN) portion 12 of the wireless communication network 10, such as the interconnections between one or more Baseband Units (BBUs), which are also referred to as Digital Units (DUs), and their respectively connected Remote Radio Units (RRUs), which are also referred to as "radio heads." Additionally, or alternatively, internode connections between RAN nodes 14 may be referred to or comprise "sidehaul" connections. Conversely, the "backhaul" network or the backhaul connections comprise the interconnections between nodes in the RAN 12 and the CN 18.

Important considerations related to RIBS include the uplink and downlink data path time-alignment f rom the Antenna Reference Point (ARP) to the Radio Equipment Controller (REC), where such information is vital for both the target (the node 14 acquiring synchronization from another node 14) and the source (the node 14 acting as the synchronization source for another node 14). Misalignment directly contributes to RIBS time-alignment observation error between the source and the target.

In one or more embodiments herein, a radio network node 14 that is configured for participation in automatic best-clock selection based on RIBS is configured to: request information identifying the N closest nodes 14, e.g., based on submitting coordinate information to an MME 20 or another node; obtain the stratum-level and Physical Cell Identity of the N closest nodes 14 and their respective transmission schedules or resource usage for the OTA synchronization signals of interest.

Notably, the radiofrequency coupling—the path characteristics—between neighboring radio network nodes 14 can vary substantially. Factors include antenna gain in the direction of the path, path distance, and path obstruction. In one or more embodiments, the preferability of another node 14 for use as a synchronization reference depends on the characteristics of radiofrequency coupling on the involved RIBS link, which may be generally referred to as reception quality or reception quality considerations. In one or more embodiments, a radio network node 14 evaluating other nodes for use as a sync reference avoids or lowers the preference for any node 14 where the radio link to the other node exhibits instability or asymmetry. Further, if using the PRS as the OTA sync signal, the target node 14 mutes its own PRS transmissions during the PRS occasions in which it requires other-node PRS for sync. With BF capability, the radio network node 14 participates in a BF discovery procedure.

One of the advantages provided by the various method and node embodiments detailed herein is that a radio network node 14 that will take its synchronization based on RIBS—i.e., a target node 14—is the node best positioned to evaluate the radio links corresponding to the various other nodes 14 in the RAN that are candidates for its selection as a synchronization source—i.e., source or candidate nodes 14. The target node 14 can, therefore, periodically or on a triggered basis, evaluate the radio link conditions between it and respective ones of the candidate nodes 14 and use the current or most-recently assessed link conditions as input data for its synchronization-source selection algorithm.

As noted, sometimes a neighbor relation is more important than clock quality (e.g., stratum level) or radio link coupling loss, meaning that a target node 14 may choose a candidate node 14 with a lower-quality clock and/or radio link if its radio link and clock quality meet defined minimum requirements and the target node 14 has a neighbor relation with the candidate node 14. Such logic reflects the fact that radio network nodes 14 operating with neighbor relations, or otherwise operating in adjacent or coordinated situations should have good phase alignment between them, e.g., for reducing mutual interference, improved handover between them, etc.

Broadly, characteristics that contribute to a suitable source/target node pairing include hearability of a transmission at the counterpart, presence of multipath, clock-quality of the Source, etc. Some characteristics are known a priori; some can be estimated, others are unknown until explicitly measured.

One or more embodiments detailed herein integrate RIBS into a PTP network where RIBS links are modeled as links of the PTP network. This approach makes advantageous use of the "special port" mechanism provided for in later implementations of the PTP specifications. The Special Port is a PTP port that implements a mechanism for transferring time over a network where the time transfer is not based on the use of PTP timing messages. A special port provides for timing information transfer when the access stratum or medium has its own timing mechanism. The PTP special port finds usage, for example, for PTP communications over Wi-Fi links.

According to one or more embodiments here, the RIBS "interface" of a radio network node 14 is treated as a special PTP port, with the propagation-related delays of the OTA synchronization signals sent/received over the RIBS interface treated as the IEEE 1588 mean path delay. The mean path delay, in this case, could be calculated as proposed in 3GPP (e.g., use of TA values or knowledge of the geographical location of the involved transmit/receive antennas.

Figure 9:
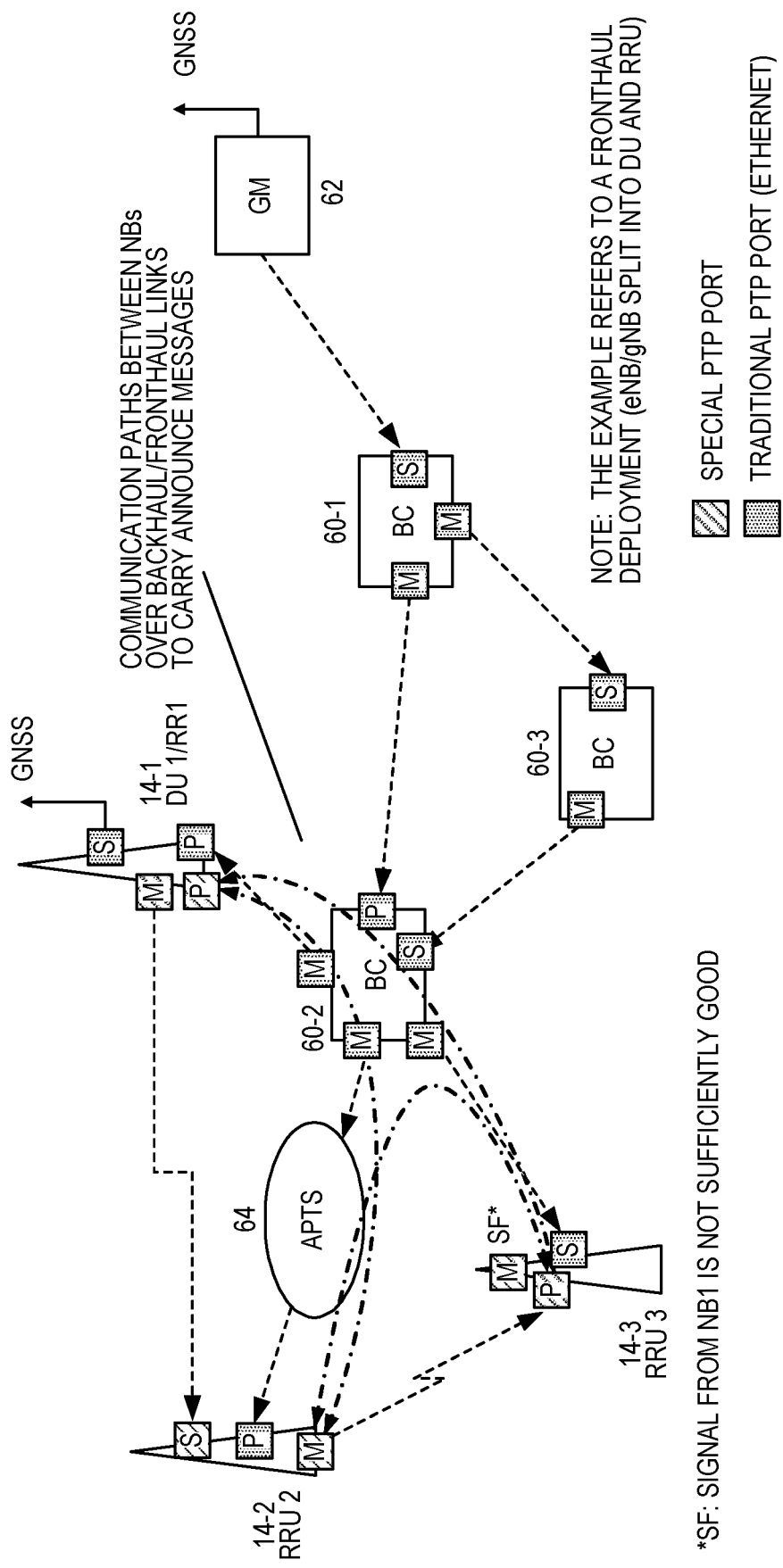
FIGS. 9-11 are block diagrams of embodiments of a RAN configured for automatic synchronization reference selection for RIBS.

FIG. 9 illustrates an embodiment of the wireless communication network 10 introduced in FIG. 6 but focuses on a given set or group of radio network nodes 14 and associated network nodes 60 and 62. The illustrated arrangement uses a combination of RIBS and PTP over Ethernet timing. In particular, one sees a number of nodes 60—e.g., interconnected via Ethernet links—operating as Boundary Clocks (BCs) in the PTP context, and a network node 62 operating as a Grand Master (GM) clock in the PTP context. Further, one sees a DU1/RR1 labeled as radio network node 14-1, an RRU2 labeled as a radio network node 14-2, and an RRU3 labeled as a radio network node 14-3.

The PTP Announce messages exchanged via the Ethernet/ network links can be validated based on the reception of corresponding OTA synchronization signals in the RIBS context. In one alternative, a radio-based protocol provides for the exchange of Announce messages, but this would not affect "standard" radio communications between the radio network nodes 14 and UEs, as it would need only support RIBS/PTP-announce communications between the nodes 14.

Figure 10:
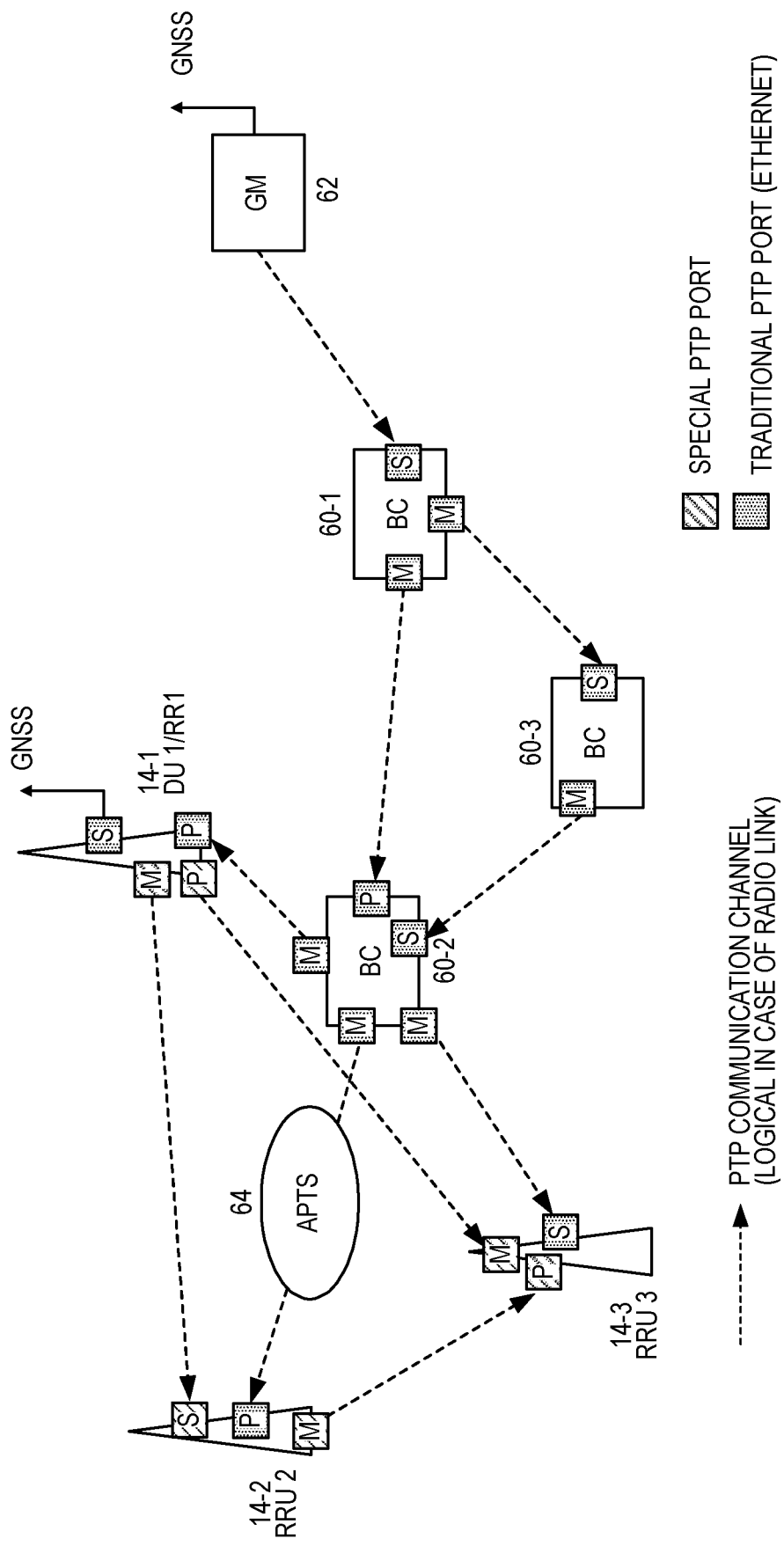

FIG. 10 illustrates an example case where three radio network nodes 14 (also referred to as RIBS nodes) are integrated into a PTP network over Ethernet network with three BCs. The RIBS nodes associate a Special PTP port (indicated in blue in the figure) to each potential neighbor RIBS node. In this way, an appropriate Alternate Best Master Clock Algorithm can define the port state and sync selection of each BC and RIBS nodes. RIBS nodes may get/send sync over the RIBS and Ethernet, while BCs do so only over Ethernet.

Figure 11:
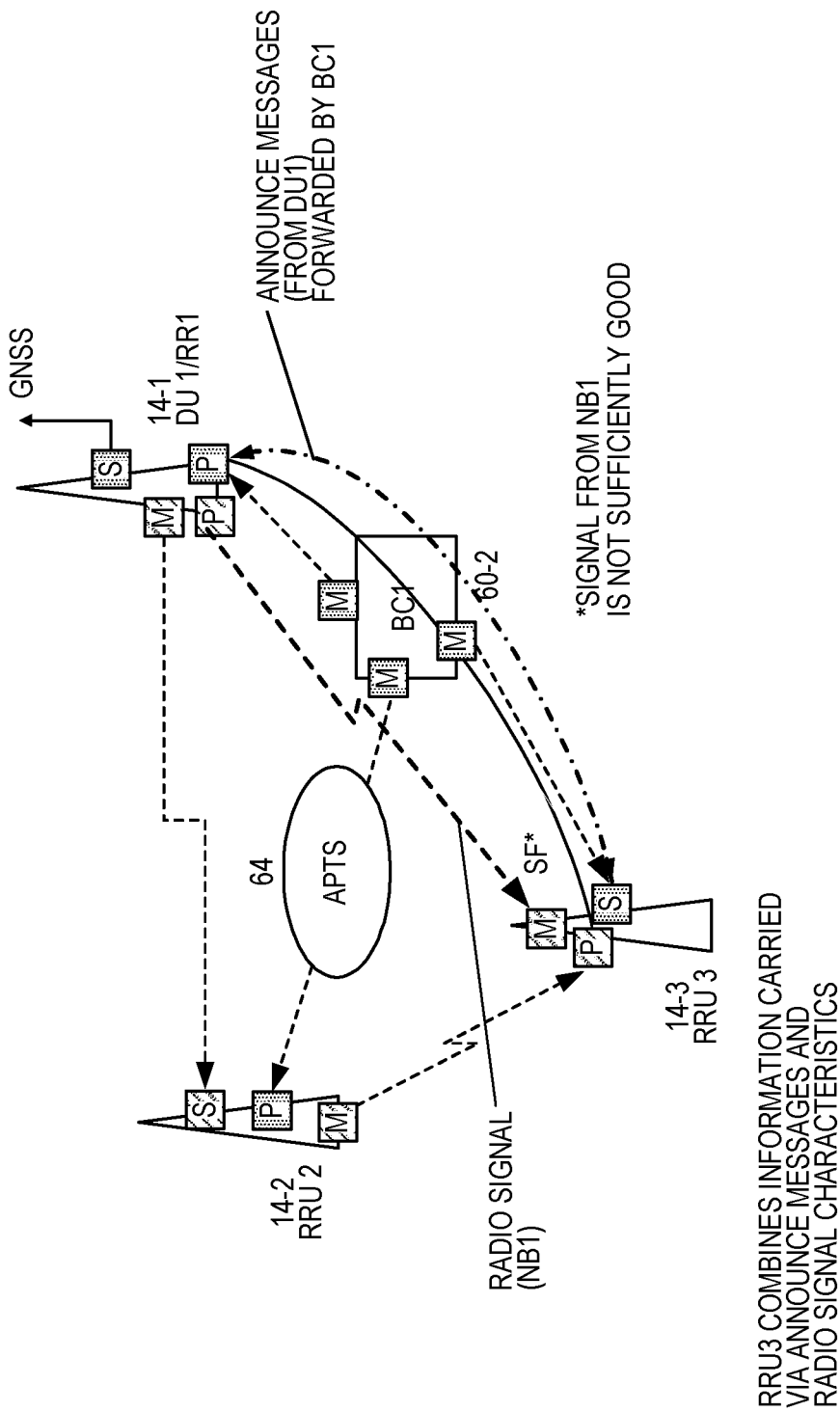

FIG. 11 illustrates what the equivalent PTP synchronization network would look like. The PTP communication channel between RIBS nodes is only logical. The signaling data (announce messages) is exchanged via the network (e.g., over an X2 connections in case of DU to DU communication, or fronthaul control channel between DU and RRU), and the sync information is exchanged OTA via the radio interface circuitry.

One or more embodiments use special PortIds (Port Numbers) and clockID ranges for clocks 44 in RIBS nodes. Such usage enables the identification of RIBS nodes belonging to synchronization "chains."

As for clock-attribute information signaled between the nodes, clock stratum (radio hops) may be implied by Clockclass and StepsRemoved parameters and/or using path Trace Type-Length-Value (TLV) identifying the RIBS nodes and links.

Radio characteristics, (e.g., RF coupling), between RIBS nodes are represented in one or more embodiments by a Signal Fail (SF) parameter, which may be a simple on/off decision flag determined for a received OTA synchronization signal. For example, the SF parameter is cleared or set to a default state if the OTA synchronization signal is received above some threshold signal quality metric (e.g., SNR, signal level, etc.), and is set to another state if the OTA synchronization signal is received below the defined threshold.

If the PTP announce messages are exchanged over backhaul connections, the receiving RIBS nodes must validate and locally handle the accuracy metrics based on radio characteristics (e.g., based on receiving OTA synchronization signals from the corresponding candidate node). SF (Signal Fail) could be used to discard a potential RIBS source (note: use of SF requires an extension of the G.8275.1 ABMCA). According to G.8275.2, if portDS.SF is TRUE on port r, then the PTP port should set the respective Ebest to the empty set. As a result, the computation of Ebest will not use the information contained in any announce messages received on the port r. See Signal fail (SF) as described in clause 6.7.11.

Further, a radio network node 14 using RIBS to select its synchronization source may dynamically set local priority parameters for source selection, but it must also include in its evaluation processing the avoidance of "timing loops" and/or use of Path Trace TLV.

Furthermore, with the ENHANCED_ACCURACY_METRICS TLV or a newly defined TLV, the radio network node 14 acting as a candidate or source for RIBS synchronization could communicate its own characteristics, although such arrangement may require a minor update of the G.8275.1 BMCA so that BMCA also considers such additional information.

Example ENHANCED_ACCURACY_METRICS TLVs are shown in the table labeled as FIG. 12. Information on degraded performance due to RIBS hops and/or characteristics of RF as well as uncompensated distance could be implicitly carried by the fields of this TLV (e.g., maxDynamicInaccuracy, GmInaccuracy, bcHopCount). Additional fields may be defined to carry relevant information (if such is not addressed by the radio protocols) such as cell antenna coordinates. Moreover, as mentioned earlier, sync requirements may be expressed in terms of relative phase error between specific radio network nodes 14 for some coordinated service (e.g., Dual Connectivity services) or for TDD systems operating at the same frequencies in overlapping radio coverage areas. Under such conditions or operating scenarios, selection of a neighbor RIBS source operating on the same frequency may be preferable, even if there is another candidate for RIBS that has an otherwise more preferable clock 44. For such purposes, the BMCA algorithm executed by the respective RIBS node(s) in at least some embodiments should include parameters relevant to dual-connectivity, TDD, or other neighbor-relation considerations, such as frequency BW, etc.

One or more embodiments disclosed herein include the integration of RIBS with an NGS based network. RIBS links are integrated into an NGS network, thereby providing direct links between antenna nodes (e.g., RRUs), to carry synchronization between them. RIBS with NGS includes radio interface to communicate between the NG members and to measure phase and frequency difference for synchronization. Advantageously, the contemplated integrations leave much of the functionality of NGS untouched. Generally, a radio network node 14 or other such "unit" with sync functionality can be equipped with NGS SW and assigned priority. Such units may be DUs or RRUs. RUs selecting an internal link as sync source, as the role of RUs in most applications is as a "Sync Receiver." However, an RU may take the "Sync Provider" role when in Hold-Over, when the RU has the best time accuracy among NGS members.

Here, a Node Group may be referred to as a "Unit Group" and the terms UGS and UGSC may be used in place of NGS and NGSC. A unit in a UG is with or without an external reference, but each such unit has a connection to one or several other units in the defined UG, i.e., it has a connection with one or more other UG members. A unit executing or configured with UGS SW takes care of synchronization by: classification of the external references on each Unit, auto detection of links for synchronization, distribution of Sync Provider external time reference characteristics, resynchronization caused by internal link failure or role changes, and other UGS, changes like priority changes or addition of new unit to the UG.

Any unit can be Sync Provider and additional UGS features provided for in one or more embodiments include a two-step procedure: port scanning/frequency synchronization—phase synchronization, and avoidance of sync loops. A simple configuration sets node priorities and candidate synchronization links within the UGS are preconfigured in one or more embodiments and are auto-detected in one or more embodiments. At least some embodiments include reporting of best candidate synchronization reference, which speeds up convergence and resolves some deadlock cases. For smooth shifting of the sync provider for a given unit in a UG, it is necessary to avoid unnecessary time reference (Sync Provider) shifts.

Figure 13:
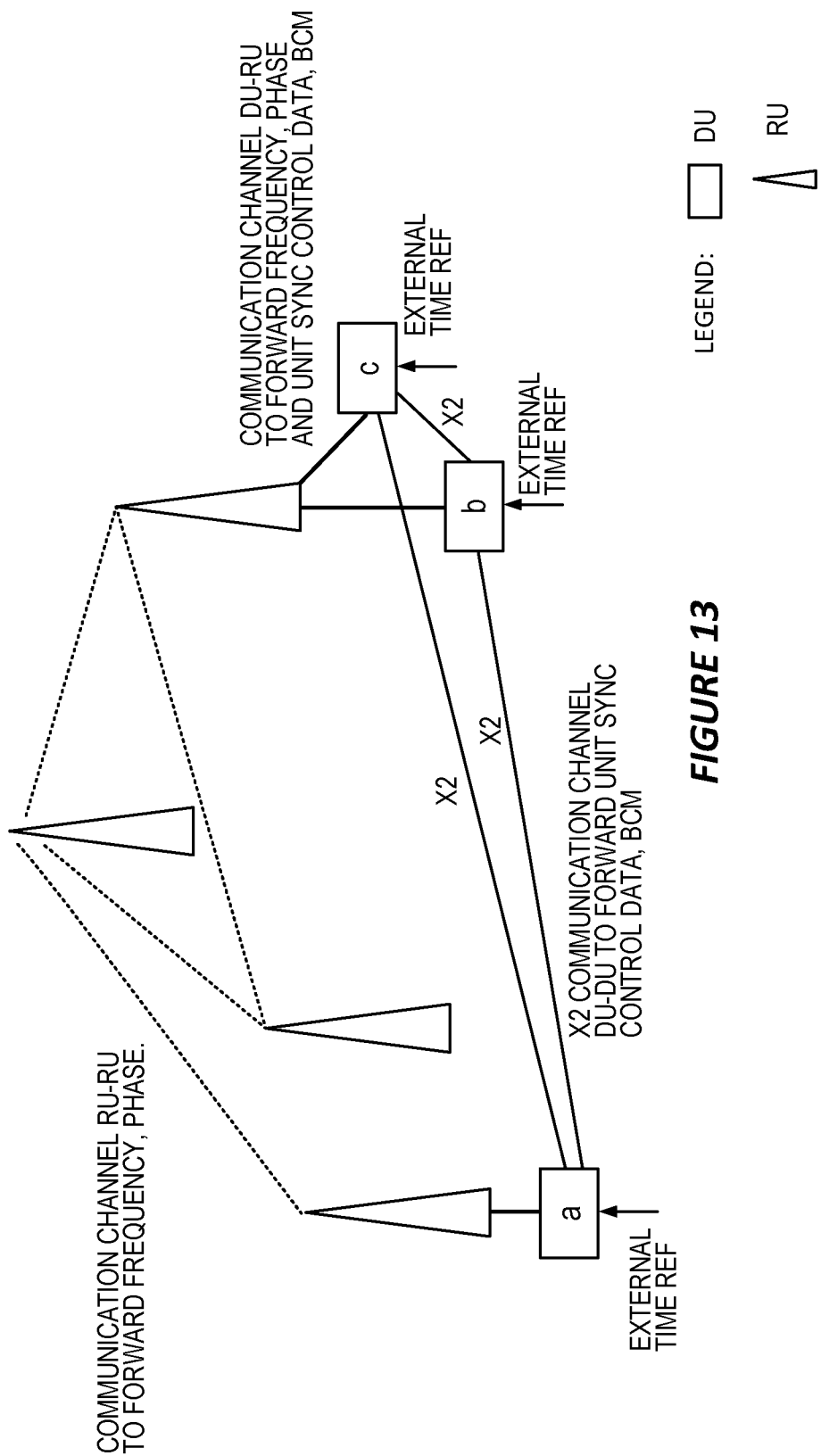
FIG. 13 is a block diagram of another embodiment of a RAN configured for automatic synchronization reference selection for RIBS.

FIG. 13 illustrates an example UGS with seven members (three DUs and four RUs). Note that support for Multi-Standard Mixed Mode (MSMM) exists in UGS. In the illustrated example, units b and c are synchronized to each other and can share the correspondingly illustrated RU.

Figure 14:
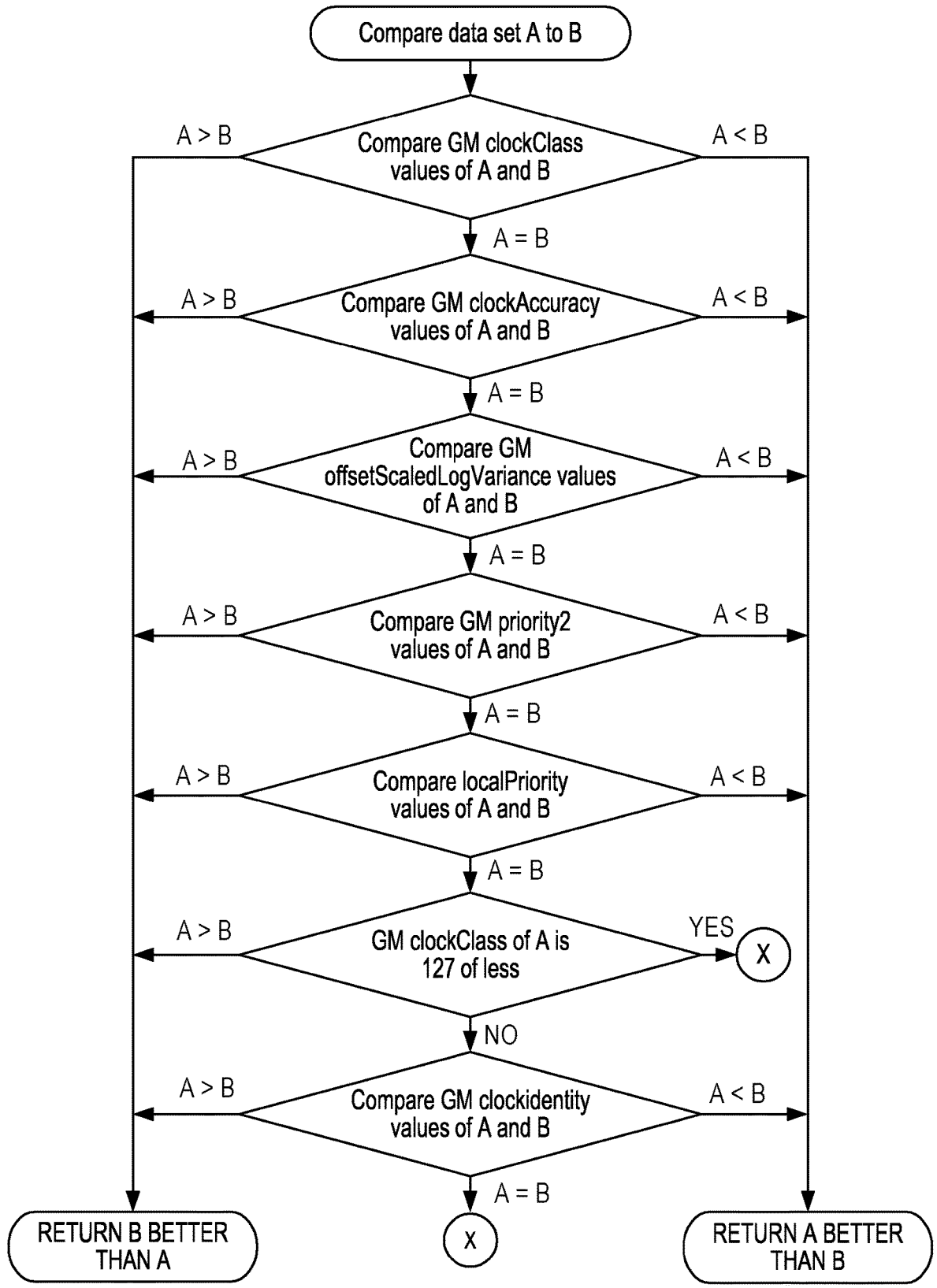
FIG. 14 is a logic flow diagram of one embodiment of a method of processing at a radio network node, for automatic synchronization reference selection for RIBS based on executing a Best Master Clock Algorithm (BMCA).

FIG. 14 illustrates an example Best Master Clock Algorithm (BMCA) method as may be implemented at a "first" radio network node 14 that is evaluating the preferability of two candidate synchronization sources A and B, e.g., two other radio network nodes 14 having RIBS links to the first radio network node 14. The BMCA algorithm compares a data set for the candidate A to a corresponding data set for the candidate B, wherein the data sets comprise various clock attributes, such as Grand Master (GM) related attributes, that may be compared to determine which candidate represents the more preferred synchronization source.

According to one or more of the example embodiments disclosed herein, radio network nodes 14 implement a method for automatic set up of a synchronization network including RIBS, based on integrating RIBS with NGS or PTP arrangements, with the latter making of the "special port" extensions of PTP. Among the various advantages of the example embodiments, they provide for automatic clock source selection in a manner that seamlessly integrates with existing synchronization network arrangements such as PTP and NGS.

Figure 15:
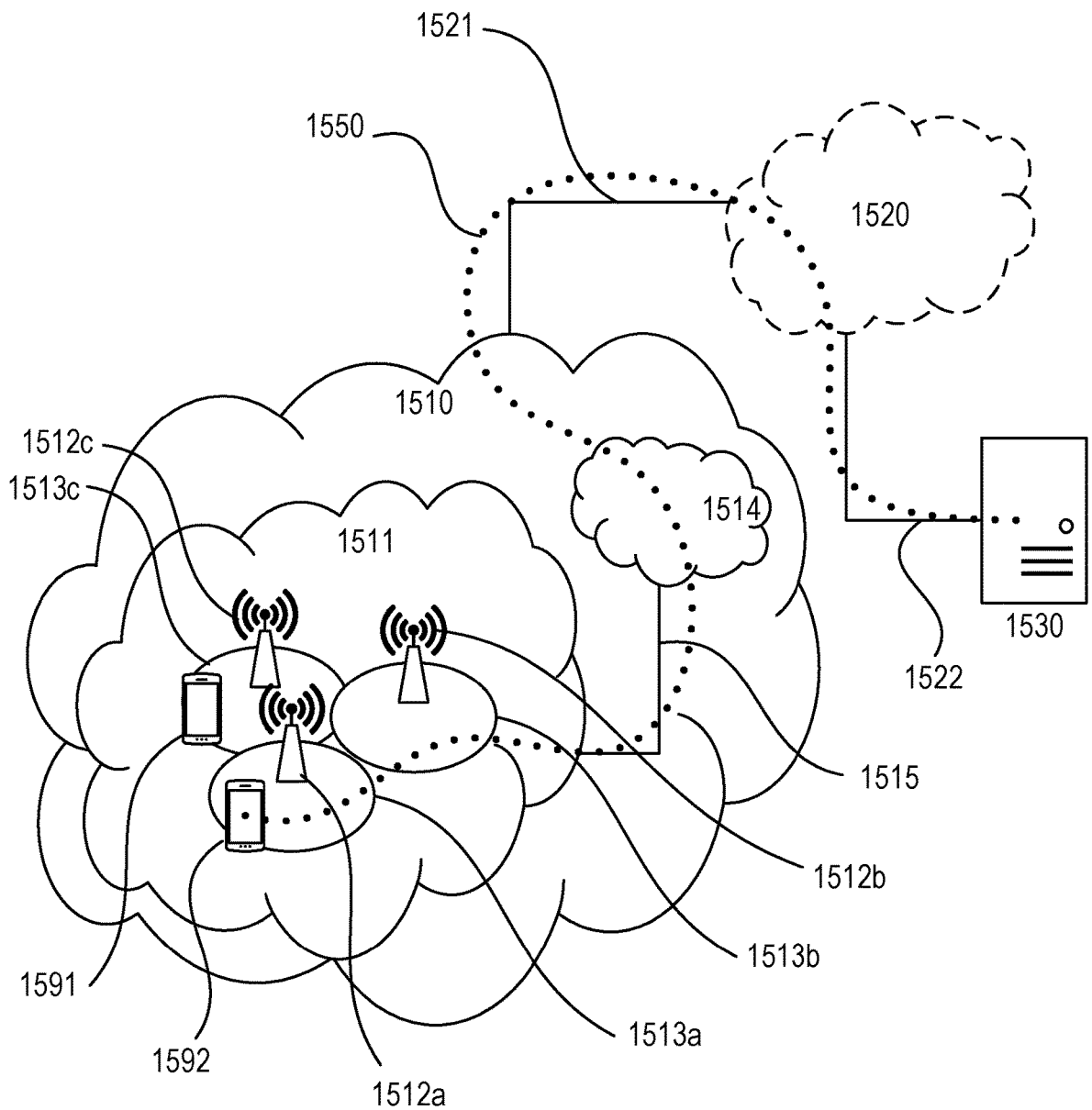
FIG. 15 illustrates an example communication system, according to some embodiments.

FIG. 15, in accordance with an embodiment, shows a communication system that includes telecommunication network 1510, such as a 3GPP-type cellular network (e.g., LTE, 5G), which comprises an access network 1511, such as a radio access network, and a core network 1514. The access network 1511 comprises a plurality of radio network nodes. In these examples, the radio network nodes are shown as base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to the core network 1514 over a wired or wireless connection 1515. A first UE 1591 located in coverage area 1513c is configured to connect wirelessly to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to host computer 1530, which may be embodied in the hardware and/or software of a standalone server, a cloud-implemented server, a distributed server or as processing resources in a server farm. The host computer 1530 may be under the ownership or control of a service provider or may be operated by the service provider or on behalf of the service provider. Connections 1521 and 1522 between the telecommunication network 1510 and the host computer 1530 may extend directly from the core network 1514 to the host computer 1530 or may go via an optional intermediate network 1520. The intermediate network 1520 may be one of, or a combination of more than one of, a public, private or hosted network; the intermediate network 1520, if any, may be a backbone network or the Internet; in particular, the intermediate network 1520 may comprise two or more sub-networks (not shown).

The communication system of FIG. 15 as a whole enables connectivity between the connected UEs 1591, 1592 and the host computer 1530. The connectivity may be described as an over-the-top (OTT) connection 1550. The host computer 1530 and the connected UEs 1591, 1592 are configured to communicate data and/or signaling via the OTT connection 1550, using the access network 1511, the core network 1514, any intermediate network 1520 and possible further infrastructure (not shown) as intermediaries. The OTT connection 1550 may be transparent in the sense that the participating communication devices through which the OTT connection 1550 passes are unaware of the routing of uplink and downlink communications. For example, the base station 1512 may not or need not be informed about the past routing of an incoming downlink communication with data originating from the host computer 1530 to be forwarded (e.g., handed over) to a connected UE 1591. Similarly, the base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, application-specific integrated circuits, field programmable gate arrays or combinations of these (not shown) adapted to execute instructions. The host computer 1610 further comprises software 1611, which is stored in or accessible by the host computer 1610 and executable by processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least wireless connection 1670 with the UE 1630 located in a coverage area (not shown in FIG. 16) served by the base station 1620. The communication interface 1626 may be configured to facilitate a connection 1660 to the host computer 1610. The connection 1660 may be direct, or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, application-specific integrated circuits, field programmable gate arrays or combinations of these (not shown) adapted to execute instructions. The base station 1620 further has software 1621 stored internally or accessible via an external connection.

The communication system 1600 further includes the UE 1630 already referred to. The hardware 1635 of the UE may include a radio interface 1637 configured to set up and maintain the wireless connection 1670 with a base station serving a coverage area in which the UE 1630 is currently located. The hardware 1635 of the UE 1630 further includes processing circuitry 1638, which may comprise one or more programmable processors, application-specific integrated circuits, field programmable gate arrays or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via UE 1630, with the support of the host computer 1610. In the host computer 1610, an executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

Figure 16:
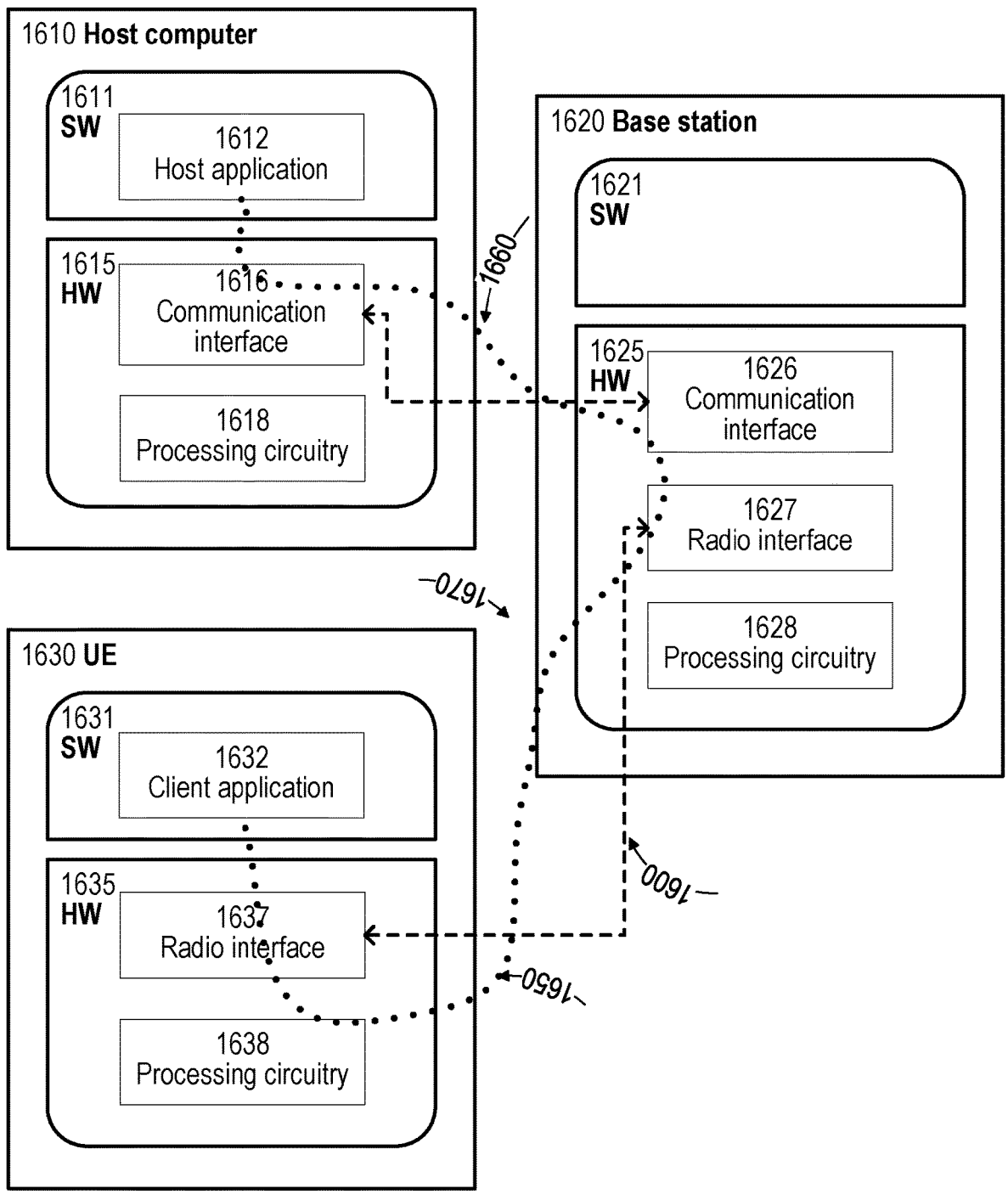
FIG. 16 is a generalized block diagram of a host computer communicating via a base station with a user equipment over a partially wireless connection, according to some embodiments.

It is noted that the host computer 1610, the base station 1620 and the UE 1630 illustrated in FIG. 16 may be similar or identical to the host computer 1530, one of base stations 1512*a*, 1512*b*, 1512*c* and one of UEs 1591, 1592 of FIG. 15, respectively. This is to say, the inner workings of these entities may be as shown in FIG. 16, and, independently, the surrounding network topology may be that of FIG. 15.

In FIG. 16, the OTT connection 1650 has been drawn abstractly to illustrate the communication between the host computer 1610 and the UE 1630 via the base station 1620, without explicit reference to any intermediary devices and the precise routing of messages via these devices. The network infrastructure may determine the routing, which it may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may enable a group of radio network nodes to carry out Best Master Clock Selection (BMCS) or Alternate BMCS algorithms on an automatic basis, thereby obviating or greatly reducing the need for manual provisioning or setup. This provides benefits such as improved efficiency of the radio network nodes and improved service experienced by users of the UEs.

A measurement procedure may be provided for the purpose of monitoring data rate, latency and other factors on which the one or more embodiments improve. There may further be an optional network functionality for reconfiguring the OTT connection 1650 between the host computer 1610 and the UE 1630, in response to variations in the measurement results. The measurement procedure and/or the network functionality for reconfiguring the OTT connection 1650 may be implemented in the software 1611 and the hardware 1615 of the host computer 1610 or in the software 1631 and the hardware 1635 of the UE 1630, or both. In embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which the software 1611, 1631 may compute or estimate the monitored quantities. The reconfiguring of the OTT connection 1650 may include message format, retransmission settings, preferred routing etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer 1610's measurements of throughput, propagation times, latency and the like. The measurements may be implemented in that the software 1611 and 1631 causes messages to be transmitted, in particular, empty or "dummy" messages, using the OTT connection 1650 while it monitors propagation times, errors, etc.

Figure 17:
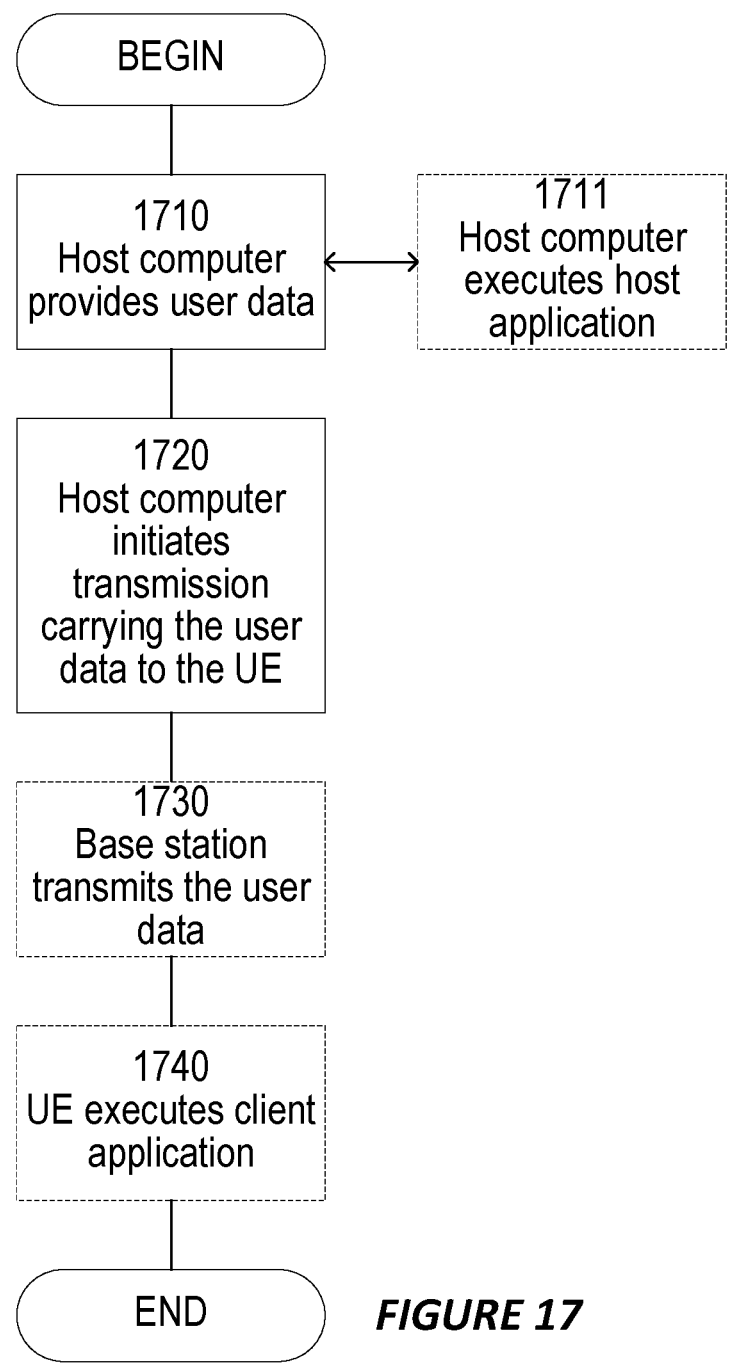
FIGS. 17-20 are flowcharts illustrating methods implemented in a communication system including a host computer, a base station, and a user equipment.

FIG. 17 is a flowchart illustrating a method implemented in a communication system, in accordance with one embodiment. The communication system includes a host computer, a radio network node (e.g., base station) and a UE which may be those described with reference to FIGS. 15 and 16. For simplicity of the present disclosure, only drawing references to FIG. 17 will be included in this section. In step 1710, the host computer provides user data. In sub-step 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
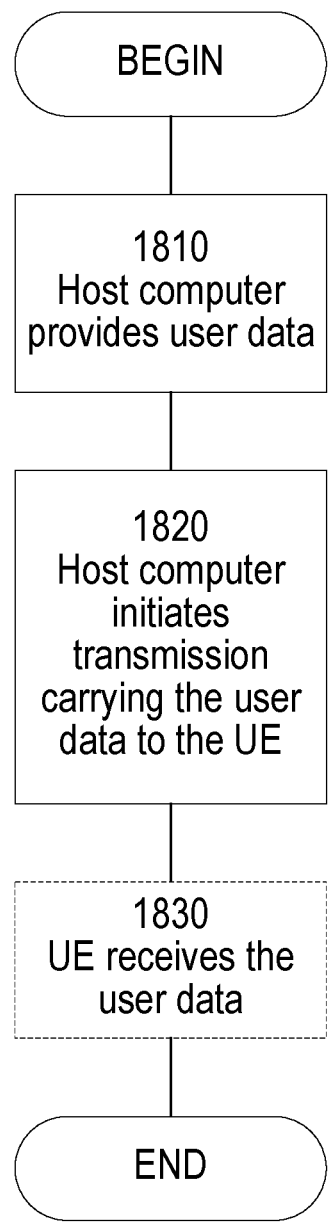

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional sub-step (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
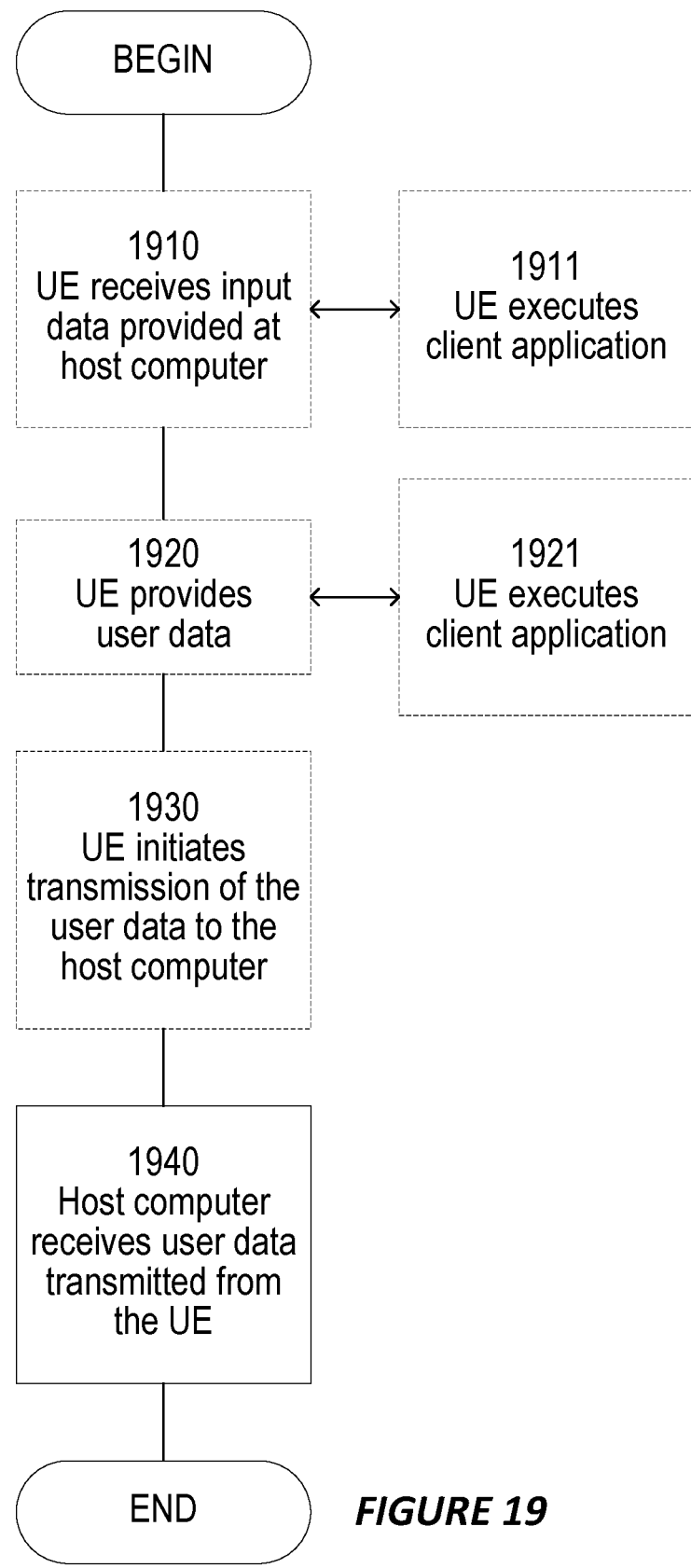

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally, or alternatively, in step 1920, the UE provides user data. In sub-step 1921 (which may be optional) of step 1920, the UE provides the user data by executing a client application. In sub-step 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in sub-step 1930 (which may be optional), transmission of the user data to the host computer. In step 1940 of the method, the host computer receives the user data transmitted from the UE, in accordance with the teachings of the embodiments described throughout this disclosure.

Figure 20:
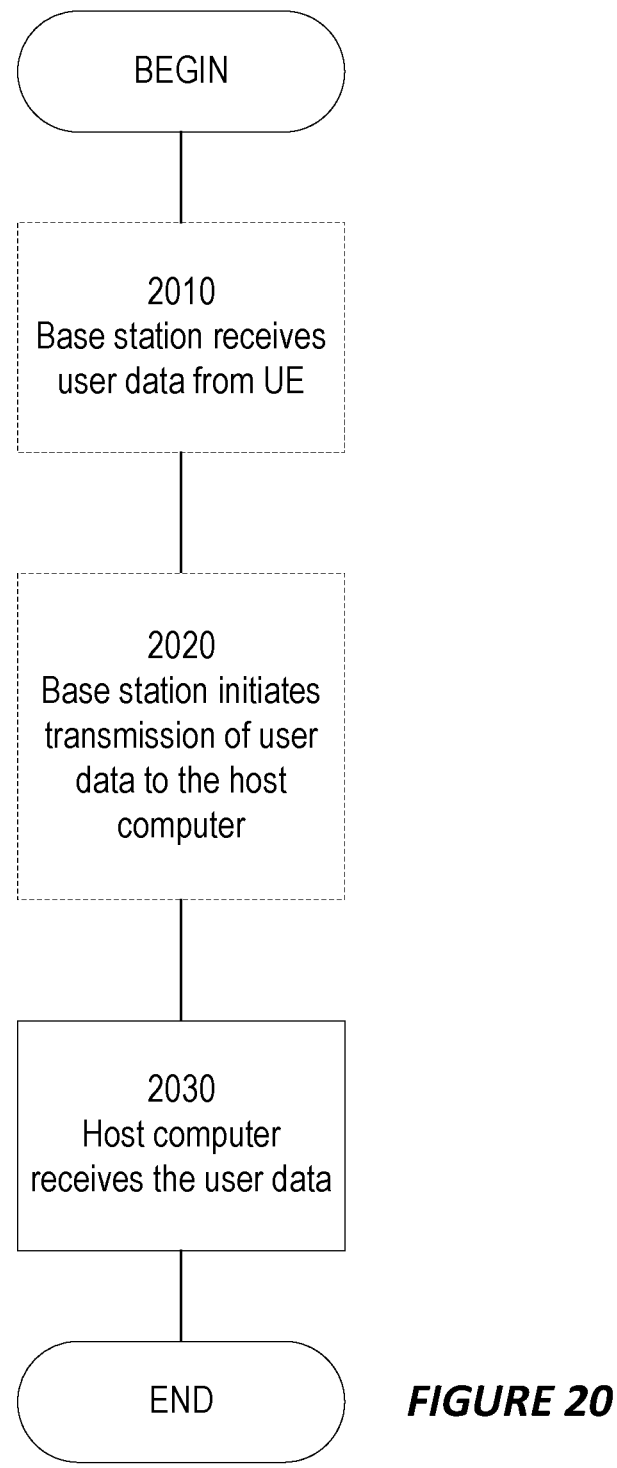

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Figure 1:
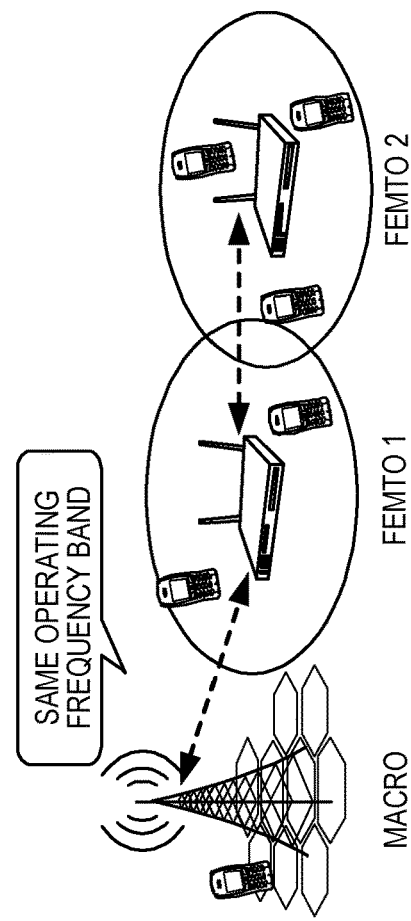
FIG. 1 is a block diagram of an example radio access network (RAN) that includes one or more radio network nodes using Radio-Interface Based Synchronization or RIBS.
Figure 1:
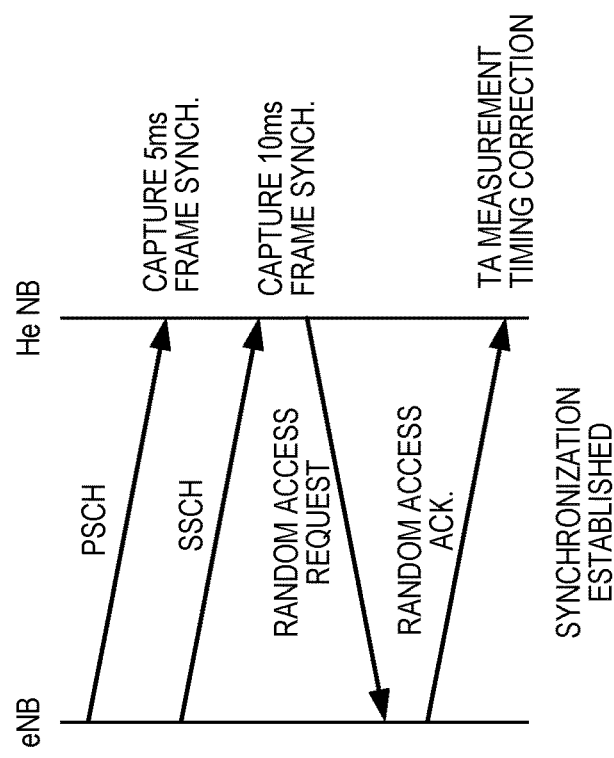
Figure 2:
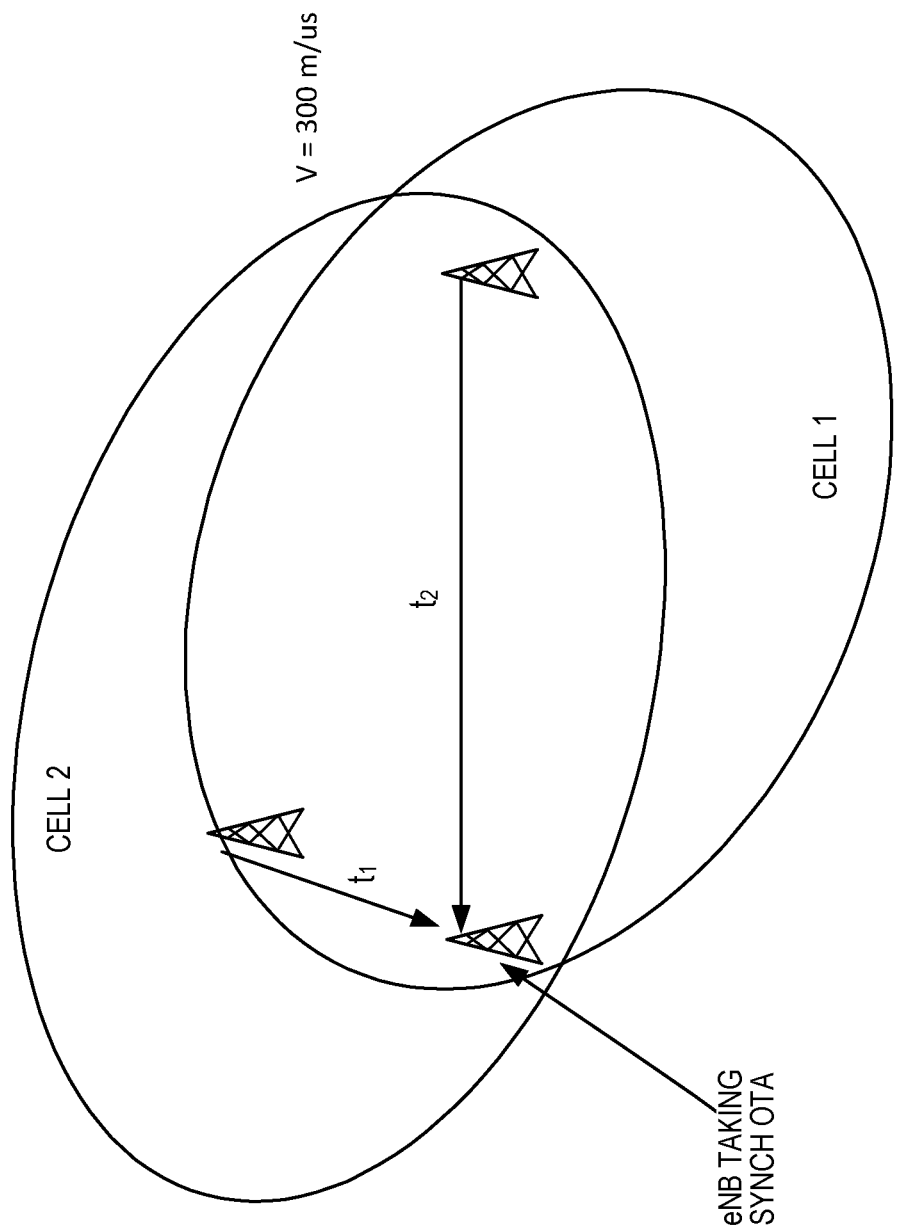
FIG. 2 is a block diagram of another example RAN that includes one or more radio network nodes using RIBS.
Figure 3:
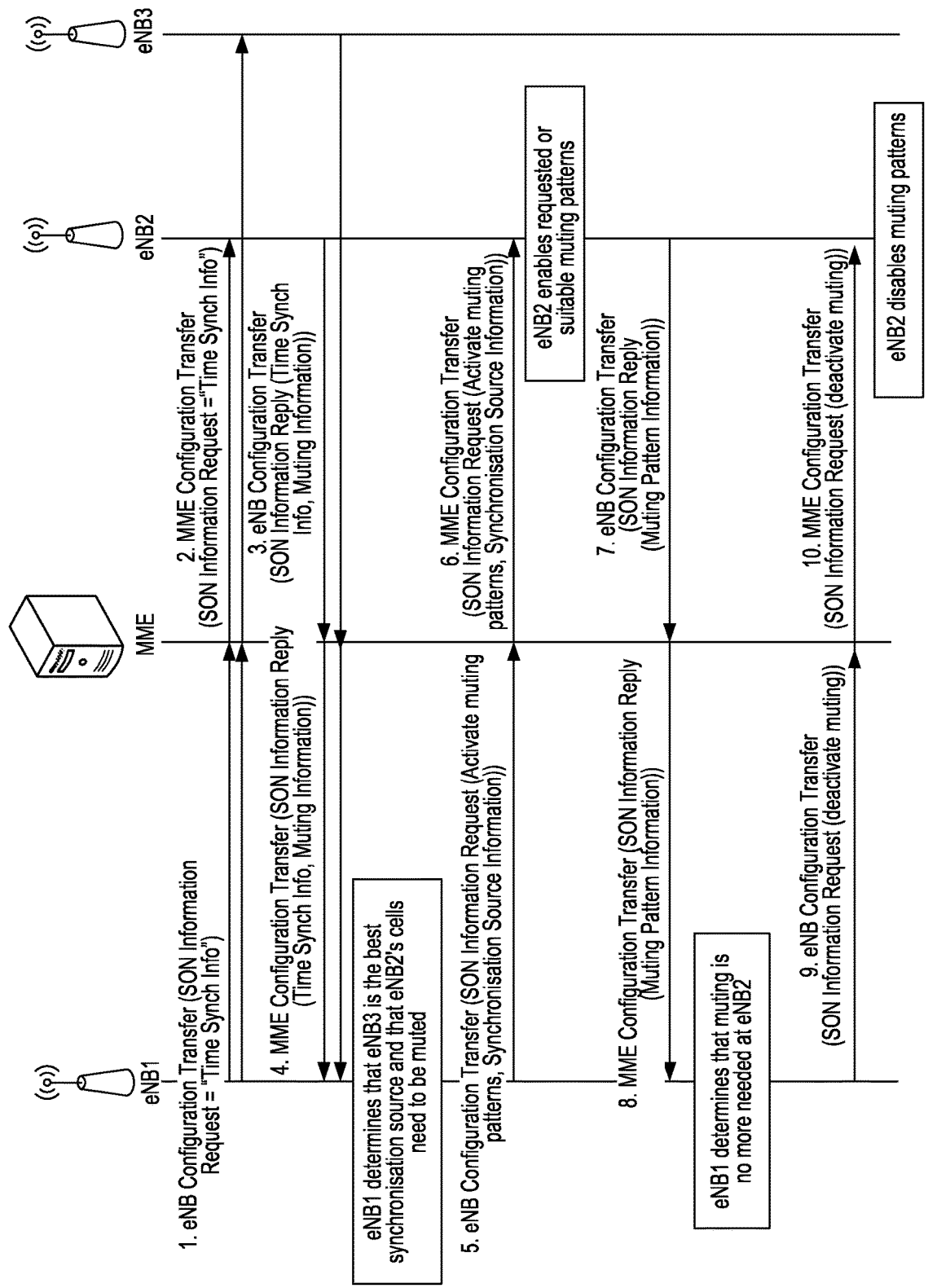
FIG. 3 is a signal flow diagram of example RIBS-based signaling between or among eNBs in a RAN, including signaling for negotiating muting by nodes that are potential interferers with respect to synchronization signal reception by a node using RIBS.

In another example embodiment that references FIGS. 6, 7, and 16, a communication system 1600 includes a host computer 1610 that includes: processing circuitry 1618 configured to provide user data; and a communication interface 1616 configured to forward the user data to a wireless communication network 10, for transmission to a user equipment (UE) 1630. The wireless communication network 10 comprises a radio network node, e.g., the node 14 in FIG. 6 or the node 1620 in FIG. 16, configured for operation in a Radio Access Network (RAN), e.g., the RAN 12 of the cellular network 10 in FIG. 2. For simplicity, the remainder of this example refers to the "radio network node 14" and the "RAN 12."

The radio network node 14 includes first communication circuitry 30 configured to receive, via radio interface circuitry, over-the-air (OTA) synchronization signals from each of two or more neighboring radio network nodes 14, wherein the OTA synchronization signals transmitted by each neighboring radio network node 14 have a discernable signal timing tied to a node clock of the neighboring radio network node 14. Further included is second communication circuitry 34 configured to receive clock-attribute information for the two or more neighboring radio network nodes 14 via a transport network interconnection, the clock-attribute information for a given neighboring radio network node 14 indicating one or more clock attributes for a clock used by the given neighboring radio network node 14 for its timing.

The radio network node 14 further includes processing circuitry 36 that is configured to: evaluate reception qualities of the respective OTA synchronization signals together with the corresponding clock-attribute information, to identify a preferred synchronization source for the radio network node 14; and synchronize a clock used by the radio network node 14 for its timing with the preferred synchronization source. The communication system 1600 may be regarded as including the radio network node 14. The communication system 1600 may further include the UE 1630, which is configured to communicate with the radio network node. The processing circuitry 1618 of the host computer 1610 in one or more embodiments is configured to execute a host application, thereby providing the user data; and the UE 1630 comprises processing circuitry 1638 configured to execute a client application associated with the host application.

In another example embodiment, a method is implemented in a communication system 1600 that includes a host computer 1610, a radio network node 14 configured for operation in a RAN 12 of a wireless communication network 10, and a UE 1630. The method includes: at the host computer, providing user data; and at the host computer, initiating a transmission carrying the user data to the UE 1630 via the network 10 comprising the radio network node 14. Correspondingly, the method includes the radio network node 14 automating radio-interface based synchronization (RIBS).

The radio network node 14 automate RIBS based on receiving, via first communication interface circuitry 30, OTA synchronization signals from each of two or more neighboring radio network nodes 14. The OTA synchronization signals transmitted by each neighboring radio network node 14 have a discernable signal timing tied to a node clock of the neighboring radio network node 14. RIBS automation at the radio network node 14 further includes receiving, via second communication interface circuitry 34, clock-attribute information for the two or more neighboring radio network nodes 14. The clock-attribute information for a given neighboring radio network node indicates one or more clock attributes for a clock used by the given neighboring radio network node 14 for its timing. The radio network node 14 evaluates reception qualities of the respective OTA synchronization signals together with the corresponding clock-attribute information, to identify a preferred synchronization source for the radio network node 14, and synchronizes a clock used by the radio network node 14 for its timing with the preferred synchronization source.

In addition to the RIBs automation operations at the radio network node, the method by the communication system 1600 may further include, at the radio network node 14, transmitting the user data. Still further, the user data in at least one embodiment of the method is provided at the host computer by executing a host application, and the method further includes, at the UE 1630, executing a client application associated with the host application.

An example communication system 1600 including a host computer 1610 comprising a communication interface 1616 configured to receive user data originating from a transmission from a UE 1630 to a base station 1620 (hereafter, referred to as "radio network node 14," with reference to FIGS. 6 and 7). The radio network node 14 is configured for operation in RAN 12 of a wireless communication network 10 and includes: first communication circuitry 30 configured to receive, via radio interface circuitry, over-the-air (OTA) synchronization signals from each of two or more neighboring radio network nodes 14. The OTA synchronization signals transmitted by each neighboring radio network node 14 have a discernable signal timing tied to a node clock of the neighboring radio network node 14.

The example radio network node 14 further includes second communication circuitry 34 configured to receive clock-attribute information for the two or more neighboring radio network nodes 14 via a transport network interconnection, the clock-attribute information for a given neighboring radio network node 14 indicating one or more clock attributes for a clock used by the given neighboring radio network node 14 for its timing. Further, the radio network node 14 includes processing circuitry 36.

The processing circuitry 36 automates RIBS at the radio network node 14, based on being configured to: evaluate reception qualities of the respective OTA synchronization signals together with the corresponding clock-attribute information, to identify a preferred synchronization source for the radio network node 14; and synchronize a clock used by the radio network node 14 for its timing with the preferred synchronization source.

In an example implementation, the host computer 1610 comprises processing circuitry 1618 that is configured to execute a host application. Correspondingly, the UE 1630 is configured to execute a client application associated with the host application, thereby providing the user data to be received by the host computer 1610.

In another example method implemented in a communication system 1600, a host computer 1610 of the communication system 1600 receives user data originating from a transmission received at a base station 1620 (hereafter "radio network node 14" with reference to FIGS. 6 and 7). The radio network node 14 may also be included in the communication system 1600, and it receives the transmission from a UE 1630, which also may be included in the communication system 1600.

The radio network node 14 automates RIBS at the radio network node 14, based on the radio network node 14: receiving, via radio interface circuitry 30, over-the-air (OTA) synchronization signals from each of two or more neighboring radio network nodes 14, wherein the OTA synchronization signals transmitted by each neighboring radio network node 14 have a discernable signal timing tied to a node clock of the neighboring radio network node 14. Further, the radio network node 14 receives, via second communication interface circuitry 34, clock-attribute information for the two or more neighboring radio network nodes 14, the clock-attribute information for a given neighboring radio network node 14 indicating one or more clock attributes for a clock used by the given neighboring radio network node 14 for its timing. The radio network node 14 evaluates reception qualities of the respective OTA synchronization signals together with the corresponding clock-attribute information, to identify a preferred synchronization source for the radio network node 14 and it synchronizes a clock used by the radio network node 14 for its timing with the preferred synchronization source.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in the memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of automating radio-interface based synchronization (RIBS) at a radio network node in a Radio Access Network (RAN) of a wireless communication network, the method comprising:

receiving, via first communication interface circuitry, over-the-air (OTA) synchronization signals from each of two or more neighboring radio network nodes, wherein the OTA synchronization signals transmitted by each neighboring radio network node have a discernable signal timing tied to a node clock of the neighboring radio network node;

receiving, via second communication interface circuitry, clock-attribute information for the two or more neighboring radio network nodes, the clock-attribute information for a given neighboring radio network node indicating one or more clock attributes for a clock used by the given neighboring radio network node for its timing;

evaluating reception qualities of the respective OTA synchronization signals together with the corresponding clock-attribute information, to identify a preferred synchronization source for the radio network node; and synchronizing a clock used by the radio network node for its timing with the preferred synchronization source; and wherein the radio network node receives the clock-attribute information in announcement messages sent according to the IEEE 1588 Precision Time Protocol (PTP), and wherein the OTA synchronization signals are treated as special port signals substituting for IEEE 1588 synchronization messages.

2. The method of claim 1, wherein the radio network node is provisioned with information, or requests the information from a node in the wireless communication network, the information indicating propagation delays between the radio network node and respective ones of the two or more neighboring radio network nodes, or the information enabling the radio network node to derive the propagation delays, and wherein the method includes the radio network node compensating the OTA synchronization signals for the propagation delays.

3. The method of claim 1, further comprising requesting and receiving information from a node in the wireless communication network identifying the two or more neighboring radio network nodes.

4. The method of claim 1, further comprising requesting and receiving information, from a node in the wireless communication network, identifying transmission schedule or resource information and acquiring, by the radio network node, the OTA synchronization signals of the two or more neighboring radio network nodes based on the information.

5. The method of claim 1, wherein the radio network node comprises a radio base station and wherein receiving the clock-attribute information comprises receiving messages exchanged over an inter-base station interface.

6. The method of claim 1, further comprising evaluating neighbor relations with respect to the two or more neighboring radio network nodes and identifying the preferred synchronization source based on a combination of neighbor relations, reception qualities of the respective OTA synchronization signals, and the corresponding clock-attribute information.

7. The method of claim 1, wherein evaluating the reception qualities of the respective OTA synchronization signals together with the corresponding clock-attribute information to identify a preferred synchronization source for the radio network node comprises choosing, from among neighboring radio network nodes having OTA signals that at least meet a minimum reception quality threshold, the neighboring radio network node having a preferred clock according to a defined set of preferences.

8. The method of claim 1, wherein the clock-attribute information includes a clock stratum indication, wherein clock stratum indicates the hop count between a clock and its timing source.

9. A radio network node configured for operation in a Radio Access Network (RAN) of a wireless communication network, the radio network node comprising:
first communication interface circuitry configured to receive over-the-air (OTA) synchronization signals from each of two or more neighboring radio network nodes, wherein the OTA synchronization signals transmitted by each neighboring radio network node have a discernable signal timing tied to a node clock of the neighboring radio network node;
second communication interface circuitry configured to receive clock-attribute information for the two or more neighboring radio network nodes via a transport network interconnection, the clock-attribute information for a given neighboring radio network node indicating one or more clock attributes for a clock used by the given neighboring radio network node for its timing; and
processing circuitry configured to:
evaluate reception qualities of the respective OTA synchronization signals together with the corresponding clock-attribute information, to identify a preferred synchronization source for the radio network node; and
synchronize a clock used by the radio network node for its timing with the preferred synchronization source; and,
wherein the radio network node is configured to receive the clock-attribute information in announcement messages sent according to the IEEE 1588 Precision Time Protocol (PTP) and to treat the OTA synchronization signals as special port signals substituting for IEEE 1588 synchronization messages.

10. The radio network node of claim 9, wherein the radio network node is provisioned with information, or is configured to request the information from a node in the wireless communication network, the information indicating propagation delays between the radio network node and respective ones of the two or more neighboring radio network nodes, or the information enabling the radio network node to derive the propagation delays, and wherein the processing circuitry is configured to compensate the OTA synchronization signals for the propagation delays.

11. The radio network node of claim 9, wherein the processing circuitry is configured to request and receive information from a node in the wireless communication network identifying the two or more neighboring radio network nodes.

12. The radio network node of claim 9, wherein the processing circuitry is configured to request and receive information from a node in the wireless communication network, the information identifying transmission schedule or resource information, and wherein the processing circuitry is further configured to acquire the OTA synchronization signals of the two or more neighboring radio network nodes based on the information.

13. The radio network node of claim 9, wherein the radio network node comprises a radio base station and is configured to receive the clock-attribute information via messages exchanged over an inter-base station interface.

14. The radio network node of claim 9, wherein the processing circuitry is configured to evaluate neighbor relations with respect to the two or more neighboring radio network nodes and identify the preferred synchronization source based on a combination of neighbor relations, reception qualities of the respective OTA synchronization signals, and the corresponding clock-attribute information.

15. The radio network node of claim 9, wherein the processing circuitry is configured to evaluate the reception qualities of the respective OTA synchronization signals, together with the corresponding clock-attribute information, to identify a preferred synchronization source for the radio network node, from among neighboring radio network nodes having OTA signals that at least meet a minimum reception quality threshold, and choose the neighboring radio network node having a preferred clock according to a defined set of preferences.

16. The radio network node of claim 9, wherein the clock-attribute information includes a clock stratum indication, wherein clock stratum indicates the hop count between a clock and its timing source.

17. A non-transitory, computer-readable medium storing a computer program comprising program instructions that, when executed by processing circuitry of a radio network node configured for operation in a Radio Access Network (RAN) of a wireless communication network, configures the radio network node to automate radio-interface based synchronization (RIBS) at the radio network node, by configuring the radio network node to: receive over-the-air (OTA) synchronization signals from each of two or more neighboring radio network nodes, wherein the OTA synchronization signals transmitted by each neighboring radio network node have a discernable signal timing tied to a node clock of the neighboring radio network node; receive clock-attribute information for the two or more neighboring radio network nodes, the clock-attribute information for a given neighboring radio network node indicating one or more clock attributes for a clock used by the given neighboring radio network node for its timing; evaluate reception qualities of the respective OTA synchronization signals together with the corresponding clock-attribute information, to identify a preferred synchronization source for the radio network node; and synchronize a clock used by the radio network node for its timing with the preferred synchronization source; and wherein the radio network node is configured to receive the clock-attribute information in announcement messages sent according to the IEEE 1588 Precision Time Protocol (PTP) and to treat the OTA synchronization signals as special port signals substituting for IEEE 1588 synchronization messages.

* * * * *